United States Patent
Zhang et al.

(10) Patent No.: US 12,408,093 B2
(45) Date of Patent: Sep. 2, 2025

(54) COMMUNICATION METHOD AND APPARATUS

(71) Applicant: Huawei Technologies Co., Ltd., Shenzhen (CN)

(72) Inventors: Hongping Zhang, Shenzhen (CN); Xingxing Hu, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 567 days.

(21) Appl. No.: 17/738,194

(22) Filed: May 6, 2022

(65) Prior Publication Data

US 2022/0264411 A1 Aug. 18, 2022

Related U.S. Application Data

(63) Continuation of application No. PCT/CN2019/116852, filed on Nov. 8, 2019.

(51) Int. Cl.
*H04W 36/00* (2009.01)
*H04W 36/32* (2009.01)

(52) U.S. Cl.
CPC ...... *H04W 36/324* (2023.05); *H04W 36/0064* (2023.05); *H04W 36/008375* (2023.05)

(58) Field of Classification Search
CPC .......... H04W 36/324; H04W 36/0064; H04W 36/008375
See application file for complete search history.

(56) References Cited

U.S. PATENT DOCUMENTS

| 8,743,825 B2 | 6/2014 | Sebire et al. | |
|---|---|---|---|
| 2016/0174282 A1* | 6/2016 | Grant | H04W 36/0079 455/422.1 |
| 2018/0270809 A1* | 9/2018 | Park | H04W 24/02 |
| 2019/0037635 A1* | 1/2019 | Guo | H04W 76/27 |

(Continued)

FOREIGN PATENT DOCUMENTS

| CN | 101507331 A | 8/2009 | |
|---|---|---|---|
| KR | 20150005421 A * | 1/2015 | H04W 36/32 |

(Continued)

OTHER PUBLICATIONS

CATT ("Inclusion of UE history IEs in Context Fetch message", R3-160610, 3GPP TSG RAN WG3 Meeting #91bis Bangalore, India , Apr. 11-15, 2016) (Year: 2016).*

(Continued)

*Primary Examiner* — Rafael Perez-Gutierrez
*Assistant Examiner* — Gilbert M Grant
(74) *Attorney, Agent, or Firm* — SLATER MATSIL, LLP

(57) ABSTRACT

A method, including sending, by a first network device, to a second network device, a first message requesting a context of a terminal device from the second network device, and receiving, by the first network device, a second message from the second network device, where the second message comprises first mobility history information and second mobility history information, where the first mobility history information is recorded by the terminal device, where the second mobility history information is recorded by a network device, and where the second message is a response message of the first message.

17 Claims, 9 Drawing Sheets

(56) References Cited

U.S. PATENT DOCUMENTS

| | | | | |
|---|---|---|---|---|
| 2019/0075613 | A1* | 3/2019 | Teyeb | H04W 76/11 |
| 2020/0351723 | A1* | 11/2020 | Kim | H04W 36/0033 |
| 2021/0352531 | A1* | 11/2021 | Vesely | H04W 76/19 |
| 2022/0279399 | A1* | 9/2022 | Liu | H04W 36/008375 |

FOREIGN PATENT DOCUMENTS

| | | |
|---|---|---|
| WO | 2018031802 A1 | 2/2018 |
| WO | 2019093850 A1 | 5/2019 |

OTHER PUBLICATIONS

Machine translation of KR-20150005421-A (Year: 2015).*
"Inclusion of UE History IEs in Context Fetch Message," Source: CATT, Agenda Item: 26.2, Document for: Discussion and Decision, 3GPP TSG RAN WG3 Meeting #91bis, R3-160610, Bangalore, India, Apr. 11-15, 2016, 6 pages.
"UE History Information," Agenda Item: 10.2.1, Source: Qualcomm Incorporated, WID/SID: NR_SON-MDT, Document for: Discussion and Decision, 3GPP TSG-RAN WG3 Meeting #105bis, R3-195480, Chongqing, China, Oct. 14-18, 2019, 6 pages.
"3rd Generation Partnership Project; Technical Specification Group Radio Access Network; NR; NR and NG-RAN Overall Description; Stage 2 (Release 15)," 3GPP TS 38.300 V15.7.0, Sep. 2019, 99 pages.
"3rd Generation Partnership Project Technical Specification Group Radio Access Network; Evolved Universal Terrestrial Radio Access (E-UTRA); Radio Resource Control (RRC); Protocol specification (Release 15)," 3GPP TS 36.331 V15.7.0, Sep. 2019, 962 pages.
"3rd Generation Partnership Project; Technical Specification Group Radio Access Network; NG-RAN; Xn application protocol (XnAP) (Release 15)," 3GPP TS 38.423 V15.5.0, Sep. 2019, 311 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 3GPP TS 36.300 V15.7.0, Sep. 2019, 365 pages.

* cited by examiner

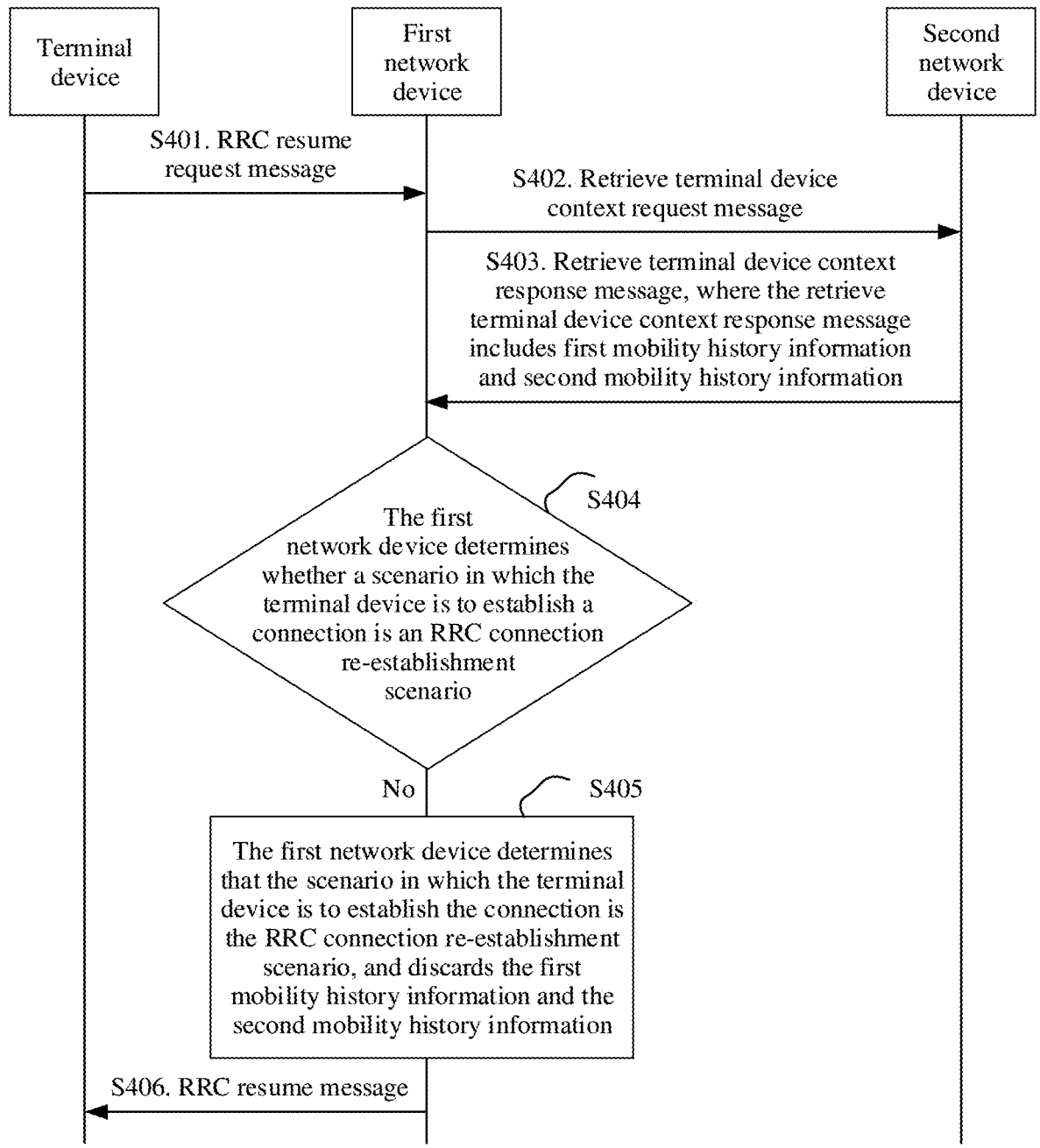

COMMUNICATION METHOD AND APPARATUS

CROSS-REFERENCE TO RELATED APPLICATIONS

This application is a continuation of International Application No. PCT/CN2019/116852, filed on Nov. 8, 2019, the disclosure of which is hereby incorporated by reference in its entirety.

TECHNICAL FIELD

This application relates to the field of mobile communication technologies, and in particular, to a communication method and apparatus.

BACKGROUND

After establishing a connection to a base station, for example, after entering a radio resource control (RRC) connected state, a terminal device encounters a radio link failure, a handover failure, or the like, which triggers the terminal device to perform an RRC connection re-establishment process, to ensure communication continuity.

In the process of performing the RRC connection re-establishment process, the terminal device performs a cell selection process to select a target cell, to initiate the RRC connection re-establishment process in the target cell to perform RRC connection re-establishment.

If the terminal device supports a function of recording mobility history information, the terminal device enters the RRC connected state from an idle state, or enters the RRC connected state from an inactive state, and the terminal device may notify a current serving base station that there is available mobility history information. When needing the mobility history information, the serving base station may request the terminal device to report the mobility history information. After the terminal device enters the RRC connected state, a network device records mobility history information of the terminal device that is recorded after the terminal device enters the connected state. In a subsequent cell handover process, a source base station sends a handover request message to a target base station. The handover request message carries the mobility history information recorded by the network device and the mobility history information reported by the terminal device. In this way, the target base station may, for example, evaluate a movement speed of the terminal device based on the mobility history information recorded by the network device and the mobility history information reported by the terminal device, and may set an appropriate measurement parameter based on the evaluated movement speed and select an appropriate target cell for subsequent cell handover. Therefore, a probability that the terminal device fails to perform cell handover and a quantity of handover times can be reduced.

However, in the RRC connection re-establishment process, according to a current standard protocol, if the target base station has not received the handover request message from the source base station, that is, the target base station to which the target cell selected by the terminal device belongs has no context of the terminal device, the target base station cannot obtain complete mobility history information of the terminal device. Consequently, the target base station cannot set an appropriate measurement parameter based on the mobility history information of the terminal device, and cannot select an appropriate target cell for the terminal device, resulting in a high handover failure probability.

SUMMARY

Embodiments of this application provide a communication method and apparatus, to reduce a probability that a terminal device fails to perform cell handover.

According to a first aspect, a first communication method is provided. The method includes a first network device sends a first message to a second network device, where the first message is used to request a context of a terminal device from the second network device, and the first network device receives a second message from the second network device, where the second message includes first mobility history information and second mobility history information, the first mobility history information is recorded by the terminal device, the second mobility history information is recorded by a network device, and the second message is a response message of the first message.

It may be understood that the method according to the first aspect may be performed by a first apparatus. The first apparatus may be a communication device, or a communication apparatus such as a chip system that can support the communication device in implementing a function required in the method. For example, the communication device is a network device, for example, a base station.

According to a second aspect, a second communication method is provided. The method includes a second network device receives a first message from a first network device, where the first message is used to request a context of a terminal device from the second network device, and the second network device sends a second message to the first network device, where the second message includes first mobility history information and second mobility history information, the first mobility history information is recorded by the terminal device, the second mobility history information is recorded by a network device, and the second message is a response message of the first message.

It may be understood that the method according to the second aspect may be performed by a second apparatus. The second apparatus may be a communication device, or a communication apparatus such as a chip system that can support the communication device in implementing a function required in the method. For example, the communication device is a network device, for example, a base station.

In some embodiments of the first aspect and the second aspect, the terminal device needs to re-establish a connection to a network device. For example, the first network device may be a target network device, and the second network device may be a device previously communicatively connected to the terminal device. In other words, the terminal device is handed over from the second network device to the first network device. The second network device may provide the mobility history information recorded by the terminal device, that is, mobility history information that is recorded before the terminal device enters a connected state. In addition, the second network device may provide the mobility history information of the terminal device that is recorded by the network device, that is, mobility history information of the terminal device that is recorded when the terminal device is in the connected state. In a possible scenario, even if the first network device has no context of the terminal device, the first network device may obtain the first mobility history information and the second mobility history information from the second network device. Therefore, the first network device can accurately evaluate a movement speed of the terminal device and the like based on the first mobility history information and the second mobility history information, to set an appropriate measurement parameter of the terminal device, and select a more appropriate target cell for the terminal device, thereby improving a success rate of performing cell handover by the terminal device.

In an embodiment of the first aspect, the first network device processes the first mobility history information and the second mobility history information differently according to different scenarios in which the terminal device is to establish a connection. The processing may be as follows.

For example, if the first network device receives an RRC re-establishment request message from the terminal device before sending the first message to the second network device, the first network device stores the first mobility history information and the second mobility history information after receiving the second message from the second network device.

For example, if the first network device receives an RRC resume request message from the terminal device before sending the first message to the second network device, the first network device discards the first mobility history information and the second mobility history information after receiving the second message from the second network device.

In the foregoing two example solutions, if the second network device sends the first mobility history information and the second mobility history information to the first network device by default, the first network device obtains the first mobility history information and the second mobility history information, and may determine a scenario in which the terminal device is to establish a connection to the first network device, for example, an RRC re-establishment scenario or an RRC resume scenario, to determine, according to the scenario in which the terminal device is to establish the connection to the first network device, to store or discard the first mobility history information and the second mobility history information. For example, if the first network device determines that the terminal device sends the RRC re-establishment request message, the first network device determines that the scenario in which the terminal device is to establish the connection to the first network device is the RRC re-establishment scenario, and determines to store the first mobility history information and the second mobility history information. If the first network device determines that the terminal device sends the RRC resume request message, the first network device determines that the scenario in which the terminal device is to establish the connection to the first network device is the RRC resume scenario, and discards the first mobility history information and the second mobility history information. This can prevent the first network device from using incomplete mobility history information. For example, in the RRC resume scenario, the terminal device may perform cell reselection in an inactive state, but the second mobility history information recorded by the network device may not include mobility history information for performing cell reselection by the terminal device, that is, the second mobility history information is incomplete.

In an embodiment of the second aspect, the second network device processes the first mobility history information and the second mobility history information differently according to different scenarios in which the terminal device is to establish a connection. The processing may be as follows.

For example, if the first message carries a context identifier of the terminal device, and the second network device determines that a type of the context identifier is RRC re-establishment, the second network device determines that the second message includes the first mobility history information and the second mobility history information, and sends the second message to the first network device.

For example, if the second network device determines that the terminal device is in an RRC connected state, the second network device determines that the second message includes the first mobility history information and the second mobility history information, and sends the second message to the first network device.

In this solution, the second network device determines, according to a scenario in which the terminal device is to establish a connection to the first network device, for example, an RRC re-establishment scenario or an RRC resume scenario, whether to send the first mobility history information and the second mobility history information to the first network device. Therefore, the first network device does not need to determine whether to discard the received first mobility history information and second mobility history information.

In the foregoing two example solutions, the second network device determines that the scenario in which the terminal device is to establish the connection to the first network device is the RRC re-establishment scenario. For example, the second network device may determine, based on the type of the context identifier of the terminal device, the scenario in which the terminal device is to establish the connection to the first network device. If the type of the context identifier of the terminal device is RRC re-establishment, the second network device determines that the scenario in which the terminal device is to establish the connection to the first network device is the RRC re-establishment scenario. Alternatively, for another example, the second network device may determine, based on a status of the terminal device, the scenario in which the terminal device is to establish the connection to the first network device. If the terminal device is in the RRC connected state, the second network device determines that the scenario in which the terminal device is to establish the connection to the first network device is the RRC re-establishment scenario.

Certainly, if the second network device determines that the type of the context identifier of the terminal device is RRC resume, the second network device determines that the scenario in which the terminal device is to establish the connection to the first network device is the RRC resume scenario. Alternatively, if the terminal device is in an RRC inactive state, the second network device determines that the scenario in which the terminal device is to establish the connection to the first network device is the RRC resume scenario. In this case, the second network device determines not to send the first mobility history information and the second mobility history information to the first network device. Therefore, the first network device receives and stores the first mobility history information and the second mobility history information. If the first network device does not receive the first mobility history information or the second mobility history information, the first network device may obtain the mobility history information from the terminal device when the first mobility history information and the second mobility history information need to be used, for example, in an RRC resume process.

For example, the second network device receives a first message from the first network device, where the first message is used to request a context of the terminal device from the second network device, and the second network device sends a second message to the first network device, where the second message is a response message of the first message, and if the first message carries a context identifier of the terminal device, and a type of the context identifier is RRC resume, the second message does not include first mobility history information or second mobility history information, or if the terminal device is in an RRC inactive state, the second message does not include first mobility history information or second mobility history information, where the first mobility history information is recorded by the terminal device, and the second mobility history information is recorded by a network device.

According to a third aspect, a first communication method is provided. The method includes a terminal device sends an RRC re-establishment request message to a first network device, the terminal device receives an RRC re-establishment message from the first network device, and the terminal device sends an RRC re-establishment complete message to the first network device, where the RRC re-establishment complete message includes first indication information, and the first indication information is used to indicate that the terminal device has available mobility history information.

It may be understood that the method according to the third aspect may be performed by a third apparatus. The third apparatus may be a communication device, or a communication apparatus such as a chip system that can support the communication device in implementing a function required in the method. For example, the communication device is a terminal device.

According to a fourth aspect, a first communication method is provided. The method includes a first network device receives an RRC re-establishment request message from a terminal device, the first network device sends an RRC re-establishment message to the terminal device, and the first network device receives an RRC re-establishment complete message from the terminal device, where the RRC re-establishment complete message includes first indication information, and the first indication information is used to indicate that the terminal device has available mobility history information.

It may be understood that the method according to the fourth aspect may be performed by a fourth apparatus. The fourth apparatus may be a communication device, or a communication apparatus such as a chip system that can support the communication device in implementing a function required in the method. For example, the communication device is a network device, for example, a base station.

In some embodiments of the third aspect and the fourth aspect, when the terminal device performs RRC re-establishment with the first network device, the terminal device may notify the first network device that the terminal device has available mobility history information. For example, the RRC re-establishment complete message sent by the terminal device to the first network device may include the indication information indicating that the terminal device has available mobility history information. In this way, even if the first network device has no context of the terminal device, the first network device may obtain mobility history information of the terminal device from the terminal device, that is, more complete mobility history information. Therefore, the first network device can accurately evaluate a historical movement speed of the terminal device and the like based on the mobility history information, to set an appropriate measurement parameter of the terminal device, and select a more appropriate target cell for the terminal device, thereby improving a success rate of performing cell handover by the terminal device.

In an embodiment of the third aspect, the terminal device may provide the mobility history information for the first network device. For example, the terminal device receives a first message from the first network device, where the first message is used to request mobility history information, and the terminal device sends a second message to the first network device, where the second message includes the mobility history information.

In an embodiment of the fourth aspect, the first network device may obtain the mobility history information of the terminal device from the terminal device when the first network device needs the mobility history information of the terminal device. For example, the first network device sends a first message to the terminal device based on the first indication information, where the first message is used to request the mobility history information, and the first network device receives a second message from the terminal device, where the second message includes the mobility history information.

For example, the first message is a message for requesting the mobility history information of the terminal device, that is, a message for requesting the terminal device to report the mobility history information, and the second message may include the mobility history information, so that the first network device obtains the mobility history information. When required, the first network device may avoid receiving unnecessary mobility history information.

It should be understood that, in some embodiments of the third aspect, the terminal device sends the RRC re-establishment complete message to the first network device, where the RRC re-establishment complete message includes the first indication information, and the first indication information is used to indicate that the terminal device has available mobility history information.

In some embodiments of the fourth aspect, the first network device receives the RRC re-establishment complete message from the terminal device, where the RRC re-establishment complete message includes the first indication information, and the first indication information is used to indicate that the terminal device has available mobility history information.

In this solution, a second network device may provide the first mobility history information and the second mobility history information, the terminal device may provide the available mobility history information, and the first network device may determine to obtain required mobility history information from the second network device or the terminal device. This is flexible, and more meets an actual requirement.

According to a fifth aspect, a communication apparatus is provided. For beneficial effects, refer to the descriptions in the first aspect. Details are not described herein again. The communication apparatus has a function of implementing behavior in the method embodiment in the first aspect. The function may be implemented by hardware, or may be implemented by hardware by executing corresponding software. The hardware or the software includes one or more modules corresponding to the foregoing function. In a possible design, the communication apparatus includes a sending unit, configured to send a first message to a second network device, where the first message is used to request a context of a terminal device from the second network device, and a receiving unit, configured to receive a second message from the second network device, where the second message includes first mobility history information and second mobility history information, the first mobility history information is recorded by the terminal device, the second mobility history information is recorded by a network device, and the second message is a response message of the first message. These modules may perform corresponding functions in the method example in the first aspect. For details, refer to the detailed descriptions in the method example. Details are not described herein again.

For technical effects achieved by the fifth aspect or the possible implementations of the fifth aspect, refer to the descriptions of the technical effects achieved by the first aspect or the possible implementations of the first aspect.

According to a sixth aspect, a communication apparatus is provided. For beneficial effects, refer to the descriptions in the second aspect. Details are not described herein again. The communication apparatus has a function of implementing behavior in the method embodiment in the second aspect. The function may be implemented by hardware, or may be implemented by hardware by executing corresponding software. The hardware or the software includes one or more modules corresponding to the foregoing function. In a possible design, the communication apparatus includes a receiving unit, configured to receive a first message from a first network device, where the first message is used to request a context of a terminal device from the communication apparatus, and a sending unit, configured to send a second message to the first network device, where the second message includes first mobility history information and second mobility history information, the first mobility history information is recorded by the terminal device, the second mobility history information is recorded by a network device, and the second message is a response message of the first message. These modules may perform corresponding functions in the method example in the second aspect. For details, refer to the detailed descriptions in the method example. Details are not described herein again.

Alternatively, in another possible design, the communication apparatus includes a receiving unit, configured to receive a first message from a first network device, where the first message is used to request a context of a terminal device from the communication apparatus, and a sending unit, configured to send a second message to the first network device, where the second message is a response message of the first message, and if the first message carries a context identifier of the terminal device, and a type of the context identifier is RRC resume, the second message does not include first mobility history information or second mobility history information, or if the terminal device is in an RRC inactive state, the second message does not include first mobility history information or second mobility history information, where the first mobility history information is recorded by the terminal device, and the second mobility history information is recorded by a network device. These modules may perform corresponding functions in the method example in the second aspect. For details, refer to the detailed descriptions in the method example. Details are not described herein again.

For technical effects achieved by the sixth aspect or the possible implementations of the sixth aspect, refer to the descriptions of the technical effects achieved by the second aspect or the possible implementations of the second aspect.

According to a seventh aspect, a communication apparatus is provided. For beneficial effects, refer to the descriptions in the third aspect. Details are not described herein again. The communication apparatus has a function of implementing behavior in the method embodiment in the third aspect. The function may be implemented by hardware, or may be implemented by hardware by executing corresponding software. The hardware or the software includes one or more modules corresponding to the foregoing function. In a possible design, the communication apparatus includes a sending unit, configured to send an RRC re-establishment request message to a first network device, and a receiving unit, configured to receive an RRC re-establishment message from the first network device, where the sending unit is further configured to send an RRC re-establishment complete message to the first network device, where the RRC re-establishment complete message includes first indication information, and the first indication information is used to indicate that the terminal device has available mobility history information. These modules may perform corresponding functions in the method example in the third aspect. For details, refer to the detailed descriptions in the method example. Details are not described herein again.

For technical effects achieved by the seventh aspect or the possible implementations of the seventh aspect, refer to the descriptions of the technical effects achieved by the third aspect or the possible implementations of the third aspect.

According to an eighth aspect, a communication apparatus is provided. For beneficial effects, refer to the descriptions in the fourth aspect. Details are not described herein again. The communication apparatus has a function of implementing behavior in the method embodiment in the fourth aspect. The function may be implemented by hardware, or may be implemented by hardware by executing corresponding software. The hardware or the software includes one or more modules corresponding to the foregoing function. In a possible design, the communication apparatus includes a sending unit, configured to send an RRC re-establishment request message to a first network device, and a receiving unit, configured to receive an RRC re-establishment message from the first network device, where the sending unit is further configured to send an RRC re-establishment complete message to the first network device, where the RRC re-establishment complete message includes first indication information, and the first indication information is used to indicate that the terminal device has available mobility history information. These modules may perform corresponding functions in the method example in the fourth aspect. For details, refer to the detailed descriptions in the method example. Details are not described herein again.

For technical effects achieved by the eighth aspect or the possible implementations of the eighth aspect, refer to the descriptions of the technical effects achieved by the fourth aspect or the possible implementations of the fourth aspect.

According to a ninth aspect, a communication apparatus is provided. The communication apparatus may be the communication apparatus in the fifth aspect, the sixth aspect, the seventh aspect, or the eighth aspect in the foregoing method embodiments, or a chip disposed in the communication apparatus in the fifth aspect, the sixth aspect, the seventh aspect, or the eighth aspect. The communication apparatus includes a communication interface and a processor, and optionally, further includes a memory. The memory is configured to store a computer program, instructions, or data. The processor is coupled to the memory and the communication interface. When the processor reads the computer program, the instructions, or the data, the communication apparatus performs the method performed by the first network device, the second network device, or the terminal device in the foregoing method embodiments.

It should be understood that the communication interface may be a transceiver in the communication apparatus, and is implemented, for example, by using an antenna, a feeder, and a codec in the communication apparatus. Alternatively, if the communication apparatus is a chip disposed in a network device, the communication interface may be an input/output interface of the chip, for example, an input/output pin. The transceiver is used by the communication apparatus to communicate with another device. For example, when the communication apparatus is a terminal device, the another device is a network device. Alternatively, when the communication apparatus is a network device, the another device is a terminal device.

According to a tenth aspect, an embodiment of this application provides a chip system. The chip system includes a processor, may further include a memory, and is configured to implement the method performed by the communication apparatus in the fifth aspect, the sixth aspect, the seventh aspect, or the eighth aspect. In a possible design, the chip system further includes a memory, configured to store program instructions and/or data. The chip system may include a chip, or may include a chip and another discrete component.

According to an eleventh aspect, an embodiment of this application provides a communication system. The system includes the communication apparatus according to the fifth aspect and the communication apparatus according to the sixth aspect, or includes the communication apparatus according to the seventh aspect and the communication apparatus according to the eighth aspect.

According to a twelfth aspect, a computer program product is provided. The computer program product includes computer program code. When the computer program code is run, the methods performed by the first network device in the foregoing aspects are performed, the methods performed by the second network device in the foregoing aspects are performed, or the method performed by the terminal device in the foregoing aspects is performed.

According to a thirteenth aspect, this application provides a computer-readable storage medium. The computer-readable storage medium stores a computer program. When the computer program is run, the methods performed by the first network device in the foregoing aspects are implemented, the methods performed by the second network device in the foregoing aspects are implemented, or the method performed by the terminal device in the foregoing aspects is implemented.

In embodiments of this application, for example, the first network device may be a target network device, and the second network device may be a device previously communicatively connected to the terminal device, that is, the terminal device is handed over from the second network device to the first network device. The second network device may provide the mobility history information recorded by the terminal device, that is, mobility history information that is recorded before the terminal device enters a connected state. In addition, the second network device may provide the mobility history information of the terminal device that is recorded by the network device, that is, mobility history information of the terminal device that is recorded when the terminal device is in the connected state. In a possible scenario, even if the first network device has no context of the terminal device, the first network device may obtain the first mobility history information and the second mobility history information from the second network device. Therefore, the first network device can accurately evaluate a movement speed of the terminal device and the like based on the first mobility history information and the second mobility history information, to set an appropriate measurement parameter of the terminal device, and select a more appropriate target cell for the terminal device, thereby improving a success rate of performing cell handover by the terminal device.

BRIEF DESCRIPTION OF THE DRAWINGS

FIG. 3 is a flowchart of mobility history information according to an embodiment of this application;

FIG. 4 is a flowchart of an example of a communication method according to an embodiment of this application;

DETAILED DESCRIPTION OF ILLUSTRATIVE EMBODIMENTS

To make objectives, technical solutions, and advantages of embodiments of this application clearer, the following further describes embodiments of this application in detail with reference to the accompanying drawings.

Figure 1:
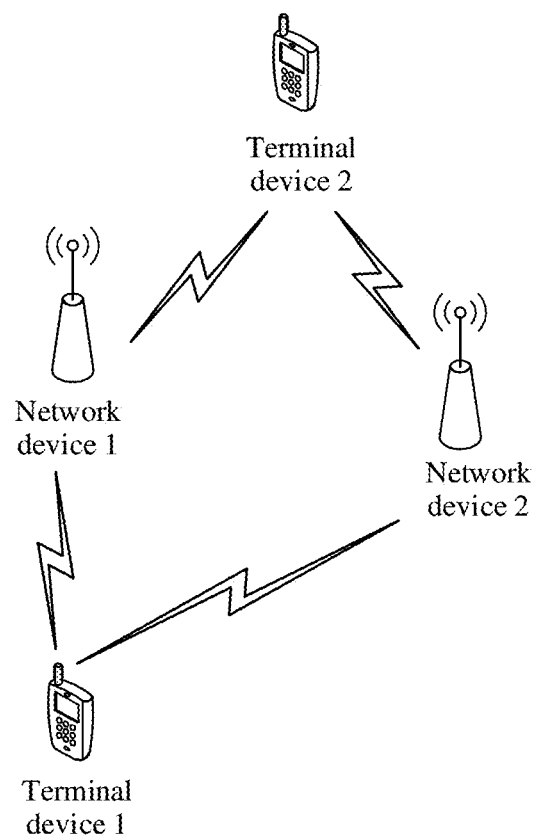
FIG. 1 is a schematic diagram of an architecture of a communication system to which an embodiment of this application is applicable.

The technical solutions of embodiments of this application described below may be applied to a network architecture shown in FIG. 1. FIG. 1 is merely an example of a communication system. The communication system may include a plurality of terminal devices and a plurality of network devices. In FIG. 1, an example in which two terminal devices and two network devices are included is used. Certainly, a quantity of terminal devices in FIG. 1 is merely an example, and there may be fewer or more terminal devices. Any network device may provide a service for a terminal device within coverage.

The terminal device may be a device that provides voice and/or data connectivity to a user, for example, may be a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IoT) terminal device, a subscriber unit (SU), a subscriber station (SS), a mobile station, a remote station, an access point (AP), a remote terminal, an access terminal, a user terminal, a user agent, an aircraft (such as a drone, a hot air balloon, or a civil aviation passenger aircraft), user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (PCS) phone, a cordless telephone set, a session initiation protocol (SIP) phone, a wireless local loop (WLL) station, or a personal digital assistant (PDA). The terminal device alternatively includes a limited device, for example, a device having low power consumption, a device having a limited storage capability, or a device having a limited computing capability. For example, the terminal device includes an information sensing device such as a barcode scanner, a radio frequency identification (RFID) device, a sensor, a global positioning system (GPS), or a laser scanner.

By way of example and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into user's clothes or accessories. The wearable device is more than a hardware device, and implements powerful functions through software support, data exchange, and cloud interaction. Broadly, wearable intelligent devices include full-featured and large-sized devices that can implement all or some functions without depending on smartphones, for example, smart watches or smart glasses, and include devices that focus only on one type of application functions and need to collaboratively work with other devices such as smartphones, for example, various smart bands, smart helmets, or smart jewelry for monitoring physical signs.

The network device may be an access network device. The access network device may also be referred to as a radio access network (RAN) device, and is a device that communicates with a wireless terminal over an air interface in an access network by using one or more sectors, or may be considered as a device that provides a wireless communication function for a terminal device. The access network device includes, for example, but is not limited to, a next generation NodeB (gNB), an evolved NodeB (eNB), a baseband unit (BBU), a transmission reception point (TRP), or a transmission point (TP) in 5G, a base station in a future mobile communication system, or an access point in a Wi-Fi system. Alternatively, the access network device may be a radio controller, a centralized unit (CU), and/or a distributed unit (DU) in a cloud radio access network (CRAN) scenario, or the network device may be a relay station, a vehicle-mounted device, a network device in a future evolved PLMN network, or the like.

The CU and the DU may be physically separated or deployed together. A plurality of DUs may share one CU. One DU may be connected to a plurality of CUs. The CU and the DU may be connected through an interface, for example, an F1 interface. The CU and the DU may be obtained through division based on protocol layers of a wireless network. For example, a possible division manner is that the CU is configured to perform functions of an RRC layer, a service data adaptation protocol (SDAP) layer, and a packet data convergence protocol (PDCP) layer, and the DU is configured to perform functions of a radio link control (RLC) layer, a media access control (MAC) layer, a physical layer, and the like. It may be understood that processing function division of the CU and the DU based on the protocol layers is merely an example, and there may be other division. For example, the CU or the DU may have functions of more protocol layers through division. For example, the CU or the DU may alternatively have some processing functions of protocol layers through division. In a design, some functions of the RLC layer and functions of a protocol layer above the RLC layer are distributed to the CU, and remaining functions of the RLC layer and functions of a protocol layer below the RLC layer are distributed to on the DU. In another design, functions of the CU or the DU may alternatively be obtained through division based on a service type or another system requirement. For example, division is performed based on a latency, functions whose processing time needs to satisfy a latency requirement are deployed on the DU, and functions whose processing time does not need to satisfy the latency requirement are deployed on the CU. A network architecture shown in the figure may be applied to a 5G communication system, and may alternatively share one or more components or resources with an LTE system. In another design, the CU may alternatively have one or more functions of a core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

Functions of the CU may be implemented by one entity, or may be implemented by different entities. For example, the functions of the CU may be further divided. For example, a control plane (CP) is separated from a user plane (UP), that is, a control plane of the CU (CU-CP) is separated from a user plane of the CU (CU-UP). For example, the CU-CP and the CU-UP may be implemented by different function entities. The CU-CP and the CU-UP may be coupled to the DU to jointly implement functions of the base station.

The terminal device may communicate with access network devices using different technologies. For example, the terminal device may communicate with an access network device supporting long term evolution (LTE), may communicate with an access network device supporting 5G, or may communicate with both an access network device supporting LTE and an access network device supporting 5G. This is not limited in embodiments of this application.

The following uses an example in which the network device is a base station. Because a terminal device is mobile, it is inevitable that a terminal device that is using a service of a base station moves to a coverage area of another base station. If handover is not performed in time, or the terminal device is blocked by a building, a radio link between the terminal device and the base station may fail. Alternatively, due to movement of the terminal device, to ensure communication continuity and service quality, a communication link between the terminal device and a cell needs to change to a communication link between the terminal device and another cell, that is, a communication link of the terminal device is switched. Switching of the communication link of the terminal device may also fail. After the terminal device enters an RRC connected state, if a radio link failure, a handover failure, or the like occurs, the terminal device is triggered to perform RRC connection re-establishment, to ensure communication continuity. When the terminal device is to perform RRC connection re-establishment, the terminal device performs a cell selection process to select a target cell, and then initiates an RRC connection re-establishment process in the target cell to perform RRC connection re-establishment.

After the terminal device enters the RRC connected state, a base station may evaluate an appropriate movement speed of the terminal device based on mobility history information of the terminal device, to set an appropriate measurement parameter, for example, time to trigger the terminal device to report a measurement report. For example, if the terminal device moves at a higher speed, the time to trigger reporting of the measurement report may be set to be shorter, that is, the terminal device is triggered to upload the measurement report more quickly, to maximally reduce a handover failure probability. For another example, the terminal device moves at a higher speed, so that the terminal device can be handed over to a cell with a larger coverage area, to maximally reduce a quantity of handover times. For another example, the base station may determine, based on the mobility history information of the terminal device, whether the terminal device performs ping-pong handover, that is, whether a terminal device at edges of two cells is handed over from one cell to the other cell and then handed over from the other cell to the cell. In this way, the base station increases a handover threshold, to maximally avoid ping-pong handover of the terminal device.

The mobility history information of the terminal device may include information about a cell recently accessed by the terminal device (for example, a serving cell (primary cell) of the terminal device in a connected state, and a cell on which the terminal device in an idle state or an inactive state camps), information about a cell that uses another radio access technology (radio access technology, RAT) and that the terminal device is in, or information about a cell in which the terminal device is out of service. Information about each cell includes a time period in which the terminal device stays in the cell and at least one of a global cell ID, a physical cell ID, and a frequency. Cells in which the terminal device stays are sorted in an access sequence.

In an embodiment of this application, if a terminal device supports a function of recording mobility history information, the terminal device enters an RRC connected mode from an idle mode, or enters the RRC connected mode from an inactive mode, and the terminal device may notify a current serving base station that there is available mobility history information. When needing the mobility history information, the serving base station may request the terminal device to report the mobility history information. After the terminal device enters the RRC connected state, a network device records mobility history information of the terminal device that is recorded after the terminal device enters the connected state. Optionally, in a subsequent cell handover process, a source base station sends a handover request message to a target base station. The handover request message carries the mobility history information recorded by the network device and the mobility history information reported by the terminal device. In this way, the target base station may, for example, evaluate a movement speed of the terminal device based on the mobility history information recorded by the network device and the mobility history information reported by the terminal device, and may set an appropriate measurement parameter based on the evaluated movement speed and select an appropriate target cell for subsequent cell handover. Therefore, a probability that the terminal device fails to perform cell handover and a quantity of handover times can be reduced.

In a conventional technology, in an RRC connection re-establishment process, if a base station serving a target cell selected by a terminal device does not have a context of the terminal device, the base station cannot obtain complete mobility history information of the terminal device. Consequently, the base station cannot appropriately configure the terminal device based on the mobility history information of the terminal device, for example, cannot set an appropriate measurement parameter, and therefore cannot select an appropriate target cell for the terminal device, resulting in a high handover failure probability.

In view of this, the technical solutions in embodiments of this application are provided. In an embodiment of this application, after receiving an RRC re-establishment request message sent by a terminal device, a first network device sends a first message to a second network device, where the first message is used to request a context of the terminal device from the second network device, and the second network device sends a second message to the first network device in response to the first message, where the second message includes first mobility history information and second mobility history information. The first mobility history information is recorded by the terminal device, and is mobility history information that is recorded before the terminal device enters a connected mode. The second mobility history information is recorded by a network device, and is mobility history information that is recorded after the terminal device enters the connected mode. In this way, even if the first network device has no context of the terminal device, the first network device can obtain the first mobility history information and the second mobility history information from the second network device, and can accurately evaluate a historical movement speed of the terminal device and the like based on the first mobility history information and the second mobility history information. In this way, an appropriate measurement parameter of the terminal device is set. In some implementations, a more appropriate target cell can be configured for the terminal device, to improve a success rate of cell handover performed by the terminal device.

The technical solutions provided in embodiments of this application are described below in detail with reference to the accompanying drawings.

Figure 2:
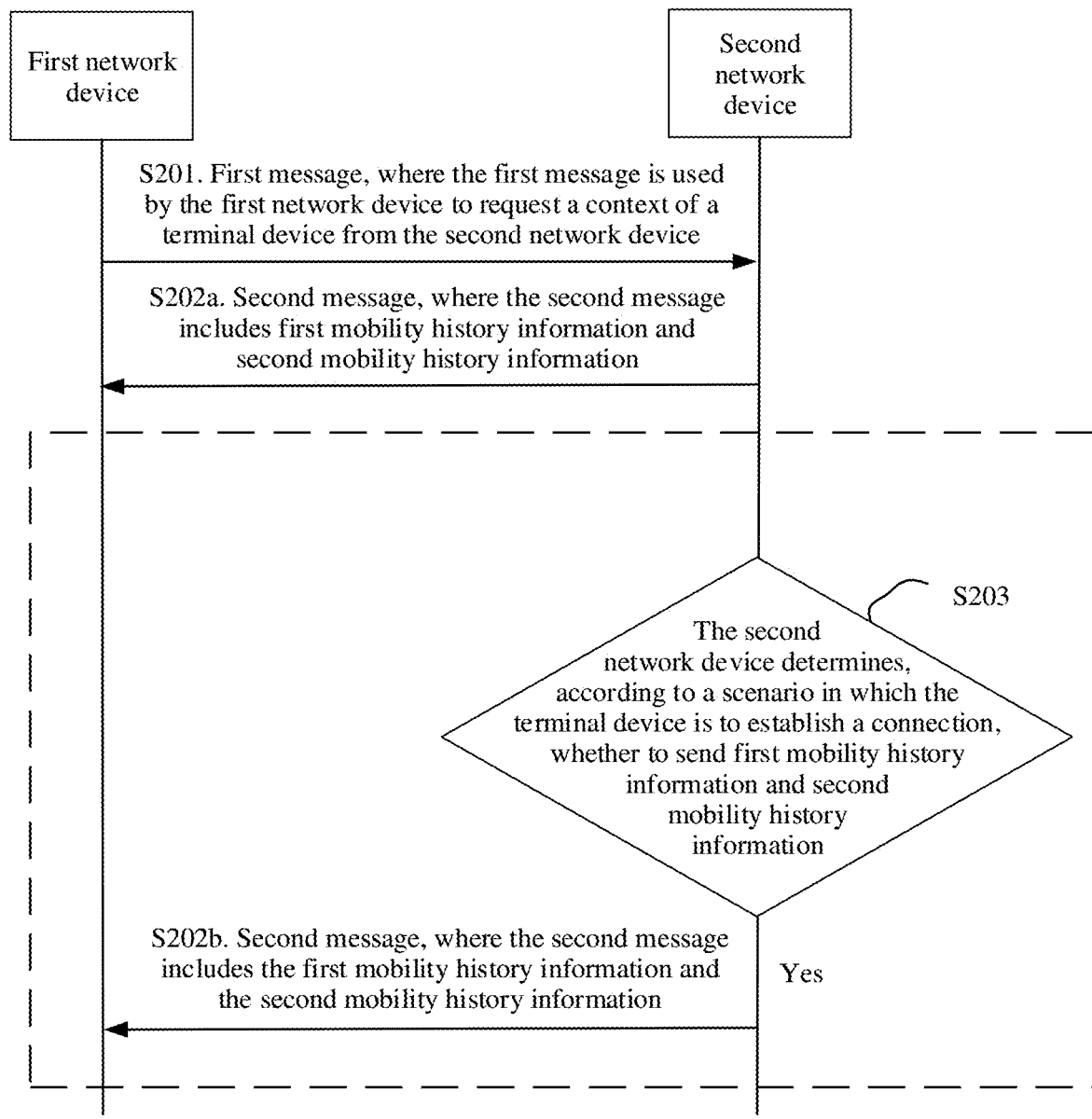
FIG. 2 is a flowchart of a communication method according to an embodiment of this application.

An embodiment of this application provides a communication method. FIG. 2 is a flowchart of the method. In the following descriptions, an example in which the method is applied to the communication system shown in FIG. 1 is used. In addition, the method may be performed by two communication apparatuses, and the two communication apparatuses are, for example, a first network device and a second network device. The first network device may be a base station or a communication apparatus (for example, a chip system) that can support the base station in implementing a function required in the method, or certainly may be another communication apparatus. The second network device may be a base station or a communication apparatus (for example, a chip system) that can support the base station in implementing a function required in the method, or certainly may be another communication apparatus. In addition, implementations of the first network device and the second network device are not limited. For example, the two network devices may be implemented in a same form. For example, both are implemented in a form of a device. Alternatively, the two network devices may be implemented in different forms. For example, the first network device is implemented in a form of a device, and the second network device is implemented in a form of a chip system.

For ease of description, in the following descriptions, an example in which the method is performed by the first network device and the second network device is used. Both the first network device and the second network device may be base stations, the first network device may be a base station to which a terminal device needs to be connected for RRC re-establishment, and the second network device may be a serving base station connected before the terminal device initiates a re-establishment process. Alternatively, the first network device may be a base station to which the terminal device needs to be connected for RRC resume, and the second network device may be a serving base station connected before the terminal device enters an RRC inactive mode.

S201. The first network device sends a first message to the second network device, and the second network device receives the first message, where the first message is used by the first network device to request a context of the terminal device from the second network device.

If the first network device determines that the terminal device needs to connect to the first network device, for example, when the terminal device is to perform RRC re-establishment connection to the first network device, or when the terminal device is to perform RRC resume connection to the first network device, the first network device may obtain the context of the terminal device from the second network device, to connect to the terminal device.

When the first network device needs to obtain the context of the terminal device, the first network device may send the first message to the second network device. The first message is used to request the context of the terminal device from the second network device. The first message may be a retrieve terminal device context request (retrieve UE context request) message.

For example, the terminal device sends an RRC re-establishment request message to the first network device, where the RRC re-establishment request message is a message for requesting to re-establish an RRC connection to the first network device. Then, after receiving the RRC re-establishment request message, the first network device may send the first message to the second network device.

For another example, the terminal device sends an RRC resume request message to the first network device. Then, after receiving the RRC resume request message, the first network device may send the first message to the second network device.

S202a. The second network device sends a second message to the first network device, and the first network device receives the second message, where the second message includes first mobility history information and second mobility history information.

The first mobility history information may be considered as mobility history information of the terminal device that is recorded by the terminal device. Correspondingly, the second mobility history information may be recorded by a network device, that is, mobility history information of the terminal device that is recorded after the terminal device enters a connected mode. It should be understood that the first mobility history information may be considered as mobility history information that is recorded before the terminal device enters the connected mode.

It should be noted that the second mobility history information may be recorded by one or more network devices. For example, if the terminal device is connected to the $1^{st}$ network device, the $1^{st}$ network device records mobility history information A of the terminal device. Then the terminal device enters coverage of the 2nd network device from coverage of the $1^{st}$ network device, that is, the terminal device is connected to the 2nd network device. The 2nd network device further records mobility history information B of the terminal device. In this case, mobility history information that is of the terminal device and that is recorded by the 2nd network device includes both the mobility history information A and the mobility history information B. That is, a next network device may add, based on mobility history information recorded by a current network device, mobility history information recorded by the next network device, to form the second mobility history information.

For ease of understanding, FIG. 3 is a schematic diagram of mobility history information. In FIG. 3, a terminal device is powered on at a moment t1, and chooses to camp on a cell 1. The terminal device records mobility history information, which, for example, referred to as mobility history information 1. The terminal device reselects a cell 2 at a moment t2, and the terminal device records mobility history information in the cell 2, which, for example, referred to as mobility history information 2.

The terminal device enters an RRC connected mode at a moment to. In this case, mobility history information that can be reported by the terminal device includes the mobility history information 1 and the mobility history information 2, that is, the first mobility history information. After the terminal device enters the RRC connected mode, a source base station may record mobility history information of the terminal device. To be specific, a network device records mobility history information of the terminal device in the cell 2 from the moment to, which, for example, referred to as mobility history information 3.

Then, the terminal device is handed over from the cell 2 to a cell 3 at a moment t3. In this case, mobility history information of the terminal device that may be delivered by the source base station to a first target base station may include the mobility history information 3, namely, the second mobility history information, recorded by the source base station starting from to, and the mobility history information 1 and the mobility history information 2, namely, the first mobility history information, that are reported by the terminal device to the source base station. The network device records mobility history information of the terminal device in the cell 3 from the moment t3, which, for example, referred to as mobility history information 4.

Then, the terminal device is handed over from the cell 3 to a cell 4 at a moment t4. Similarly, in this case, mobility history information of the terminal device that may be delivered by the first target base station that serves as the source base station to a second target base station may include the mobility history information 3 and the mobility history information 4, namely, the second mobility history information, and the mobility history information 1 and the mobility history information 2, namely, the first mobility history information, that are reported by the terminal device to the source base station. The network device records mobility history information of the terminal device in the cell 4 from the moment t4, which, for example, referred to as mobility history information 5.

Then, a radio link fails, and the terminal device initiates re-establishment at a moment t5. In this case, mobility history information that can be obtained by a third target base station from the second target base station may include the mobility history information 1 and the mobility history information 2 (the first mobility history information reported by the terminal device), and the mobility history information 3 and the mobility history information 4 (the second mobility history information recorded by the network device).

The second message is a response message of the first message. For example, if the first message is a retrieve UE context request message, the second message may be a retrieve UE context response message. Because the second message includes the first mobility history information and the second mobility history information, even if the first network device has no context of the terminal device, for example, when the first network device has not received a handover request message from the second network device in an RRC connection re-establishment process, the first network device can obtain the first mobility history information and the second mobility history information from the second network device, that is, more complete mobility history information. In this way, an appropriate measurement parameter can be set based on the obtained mobility history information, and an appropriate target cell can be selected for the terminal device, to maximally improve a cell handover success rate. For example, if the mobility history information obtained by the first network device is more complete, a movement speed of the terminal device may be more accurately evaluated based on the mobility history information, and a measurement parameter that is set based on the evaluated movement speed is more appropriate. For example, if the terminal device moves at a higher speed, the terminal device can be handed over to a cell with larger coverage, that is, a more appropriate target cell can be selected for the terminal device, to maximally reduce a quantity of handover times. If the terminal device moves at a higher speed, time to trigger reporting of a measurement report may be set to be shorter, that is, the terminal device is triggered to upload the measurement report more quickly, to maximally reduce a failure probability of performing cell handover by the terminal device.

Optionally, after receiving the second message, the first network device may determine, according to an actual application scenario, whether the first mobility history information and the second mobility history information are available. If the terminal device sends the RRC re-establishment request message to the first network device, that is, in an RRC connection re-establishment scenario, because the first mobility history information and the second mobility history information are complete, the first mobility history information and the second mobility history information are available. If the terminal device sends the RRC resume request message to the first network device, that is, in an RRC resume scenario, the terminal device may perform cell reselection in the inactive state, but the second mobility history information recorded by second network device may not include mobility history information that is recorded when the terminal device performs cell reselection, that is, the second mobility history information is incomplete. In this case, the first mobility history information and the second mobility history information are unavailable. If the first mobility history information and the second mobility history information are available, the first network device may store the first mobility history information and the second mobility history information. If the first mobility history information and the second mobility history information are unavailable, the first network device may discard the first mobility history information and the second mobility history information. In this way, the first network device can avoid using incomplete mobility history information, and can obtain complete mobility history information of the terminal device when necessary.

The following uses two possible scenarios as examples to describe how the first network device processes the first mobility history information and the second mobility history information after receiving the second message.

In a first possible scenario, if the first network device determines, before the first network device sends the first message to the second network device, that the terminal device sends the RRC re-establishment request message to the first network device, the first network device may determine that a scenario in which the terminal device is to establish a connection to the first network device is the RRC connection re-establishment scenario. If the first network device determines that the scenario in which the terminal device is to establish the connection to the first network device is the RRC connection re-establishment scenario, after receiving the second message, the first network device obtains and stores the first mobility history information and the second mobility history information. It should be understood that, that the first network device stores the first mobility history information and the second mobility history information may be understood as that the first network device stores the first mobility history information and the second mobility history information for subsequent use. Alternatively, that the first network device stores the first mobility history information and the second mobility history information may be understood as that the first network device currently uses the first mobility history information and the second mobility history information.

In a second possible scenario, if the first network device determines, before the first network device sends the first message to the second network device, that the terminal device sends the RRC resume request message to the first network device, the first network device may determine that a scenario in which the terminal device is to establish a connection to the first network device is the RRC resume scenario. If the first network device determines that the scenario in which the terminal device is to establish the connection to the first network device is the RRC resume scenario, after receiving the second message, the first network device discards the first mobility history information and the second mobility history information. It should be understood that, that the first network device discards the first mobility history information and the second mobility history information may be understood as that the first network device obtains the first mobility history information and the second mobility history information, but does not store the first mobility history information and the second mobility history information. Alternatively, that the first network device discards the first mobility history information and the second mobility history information may be understood as that the first network device does not use the first mobility history information and the second mobility history information.

After receiving the first message, the second network device sends the first mobility history information and the second mobility history information to the first network device by default. In an alternative solution, the second network device may determine, according to different scenarios in which the terminal device requests to establish a connection, whether to send the first mobility history information and the second mobility history information to the first network device, that is, determine whether to include the first mobility history information and the second mobility history information in the second message. In this solution, after receiving the second message, the first network device stores the first mobility history information and the second mobility history information if the second message includes the first mobility history information and the second mobility history information, and does not need to determine whether to discard the received first mobility history information and the received second mobility history information. In other words, S202a may be replaced with S203 and S202b.

S203. The second network device determines, according to a scenario in which the terminal device is to establish a connection, whether to send first mobility history information and second mobility history information.

In a possible implementation, the second network device may determine, based on a type of a context identifier of the terminal device, a scenario in which the terminal device requests to establish the connection. For example, the first message may carry the context identifier of the terminal device, and the type of the context identifier may indicate the scenario in which the terminal device requests to establish the connection. For example, if the type of the context identifier is RRC re-establishment, the scenario in which the terminal device requests to establish the connection is an RRC connection re-establishment scenario, or if the type of the context identifier is RRC resume, the scenario in which the terminal device requests to establish the connection is an RRC resume scenario.

In another possible implementation, the second network device may determine, based on a status of the terminal device in the context of the terminal device that is stored by the second network device, a scenario in which the terminal device requests to establish the connection. For example, if the terminal device is in an RRC connected mode, the scenario in which the terminal device requests to establish the connection is an RRC connection re-establishment scenario. If the terminal device is in an inactive mode, the scenario in which the terminal device requests to establish the connection is an RRC resume scenario instead of the RRC connection re-establishment scenario.

If the second network device determines that the scenario in which the terminal device requests to establish the connection is the RRC connection re-establishment scenario, the second network device determines that the second message includes the first mobility history information and the second mobility history information. If the second network device determines that the scenario in which the terminal device requests to establish the connection is the RRC resume scenario, the second network device determines that the second message does not include the first mobility history information or the second mobility history information. Therefore, the first network device stores the first mobility history information and the second mobility history information after receiving the second message. If the first network device does not receive the first mobility history information or the second mobility history information, the first network device may obtain the mobility history information from the terminal device when the first mobility history information and the second mobility history information need to be used.

It should be understood that if the second network device performs S203, the second network device then performs S202b, that is, the second network device sends the second message to the first network device, and the first network device receives the second message. If the second network device determines that the scenario in which the terminal device is to establish the connection is the RRC re-establishment scenario, the second message includes the first mobility history information and the second mobility history information. If the second network device determines that the scenario in which the terminal device is to establish the connection is the RRC resume scenario, the second message does not include the first mobility history information or the second mobility history information. In FIG. 2, S203 and S202b are shown in a dashed-line box. Either the steps shown in the dashed-line box or S202a are/is selected for execution.

The following separately describes some sub-solutions in the embodiment shown in FIG. 2 by using examples.

In a procedure shown in FIG. 4, an example in which a second network device sends first mobility history information and second mobility history information to a first network device by default is used.

S401. A terminal device sends an RRC resume request message to the first network device.

S402. The first network device sends a retrieve terminal device context request (retrieve UE context request) message to the second network device.

S403. The second network device sends a retrieve terminal device context response (retrieve UE context response) message to the first network device.

The retrieve UE context response message includes the first mobility history information and the second mobility history information. For example, the retrieve terminal device context response message may carry a first information element indicating the first mobility history information and a second information element indicating the second mobility history information. For example, the first information element may be represented as "UE history information from the UE", and the second information element may be represented as "UE history information".

S404. The first network device determines whether a scenario in which the terminal device is to establish a connection is an RRC connection re-establishment scenario.

S405. The first network device determines that the scenario in which the terminal device is to establish the connection is an RRC resume scenario, and discards the first mobility history information and the second mobility history information.

Optionally, the method in this embodiment may further include the following step.

S406. The first network device sends an RRC resume message to the terminal device.

In FIG. 4, an example in which the terminal device sends the RRC resume request to the first network device is used in S401. It should be understood that if the terminal device sends an RRC re-establishment request message to the first network device in S401, in S405, the first network device determines that the scenario in which the terminal device is to establish the connection is the RRC connection re-establishment scenario, and stores the first mobility history information and the second mobility history information.

For some specific implementation details of the steps in the procedure shown in FIG. 4, refer to related descriptions in the embodiment shown in FIG. 2. Details are not described herein again.

Figure 5:
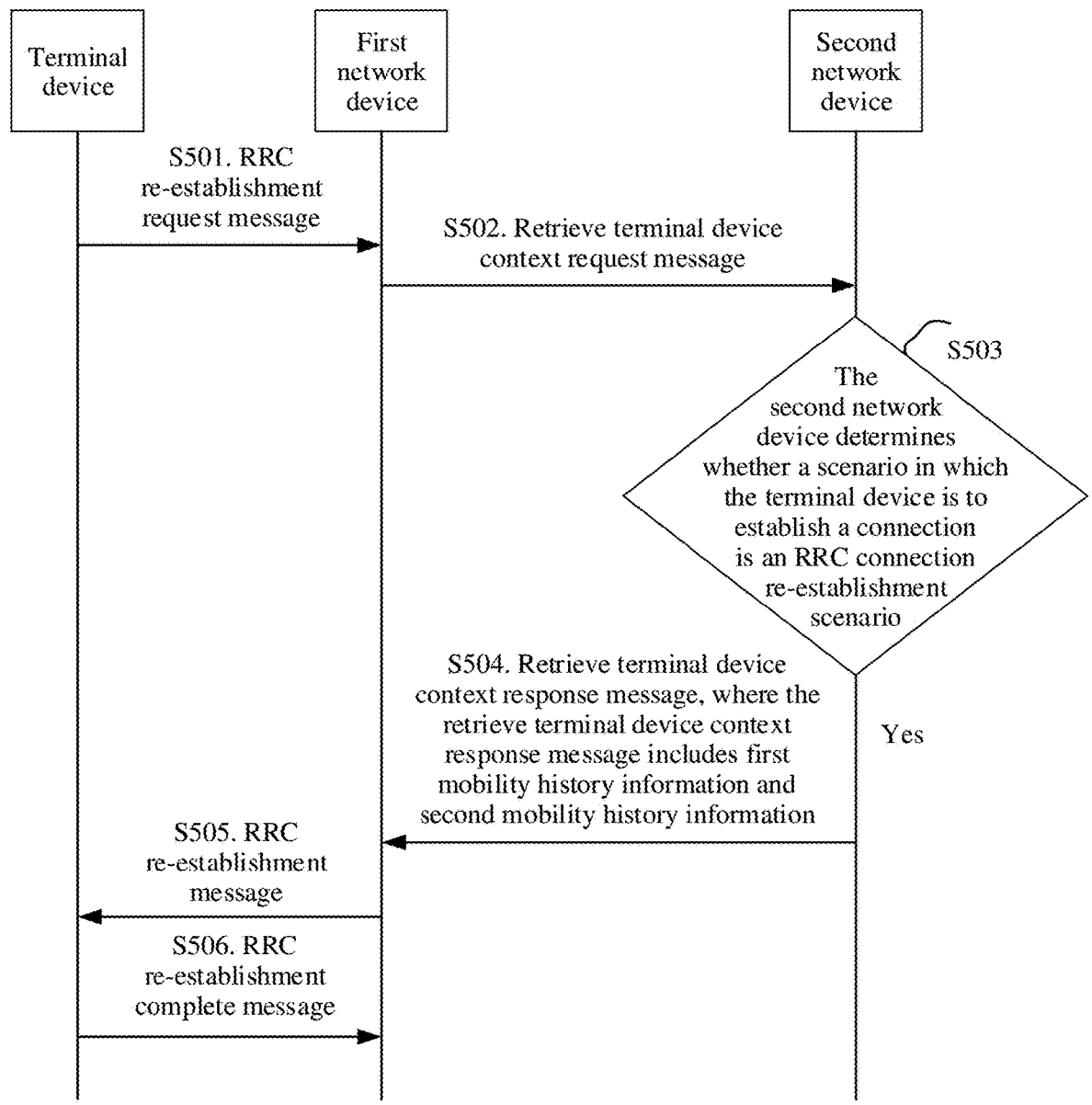
FIG. 5 is a flowchart of an example of a communication method according to an embodiment of this application.

In a procedure shown in FIG. 5, an example in which a second network device determines, according to a scenario in which a terminal device is to establish a connection, whether to send first mobility history information and second mobility history information to a first network device is used.

S501. The terminal device sends an RRC re-establishment request message to the first network device.

S502. The first network device sends a retrieve terminal device context request message to the second network device.

S503. The second network device determines whether the scenario in which the terminal device is to establish the connection is an RRC connection re-establishment scenario.

S504. The second network device determines that the scenario in which the terminal device is to establish the connection is the RRC connection re-establishment scenario, and sends a retrieve terminal device context response message to the first network device, where the retrieve terminal device context response message includes the first mobility history information and the second mobility history information.

Optionally, the method in this embodiment may further include the following steps.

S505. The first network device sends an RRC re-establishment message to the terminal device.

S506. The terminal device sends an RRC re-establishment complete message to the first network device.

In FIG. 5, S504 is a step performed when the second network device determines that the scenario in which the terminal device is to establish the connection is the RRC connection re-establishment scenario. It should be understood that if the second network device determines that the scenario in which the terminal device is to establish the connection is an RRC resume scenario, in S504, the second network device determines that the retrieve terminal device context response message does not include the first mobility history information or the second mobility history information.

For some specific implementation details of the steps in the procedure shown in FIG. 5, refer to related descriptions in the embodiment shown in FIG. 2. Details are not described herein again.

Figure 6:
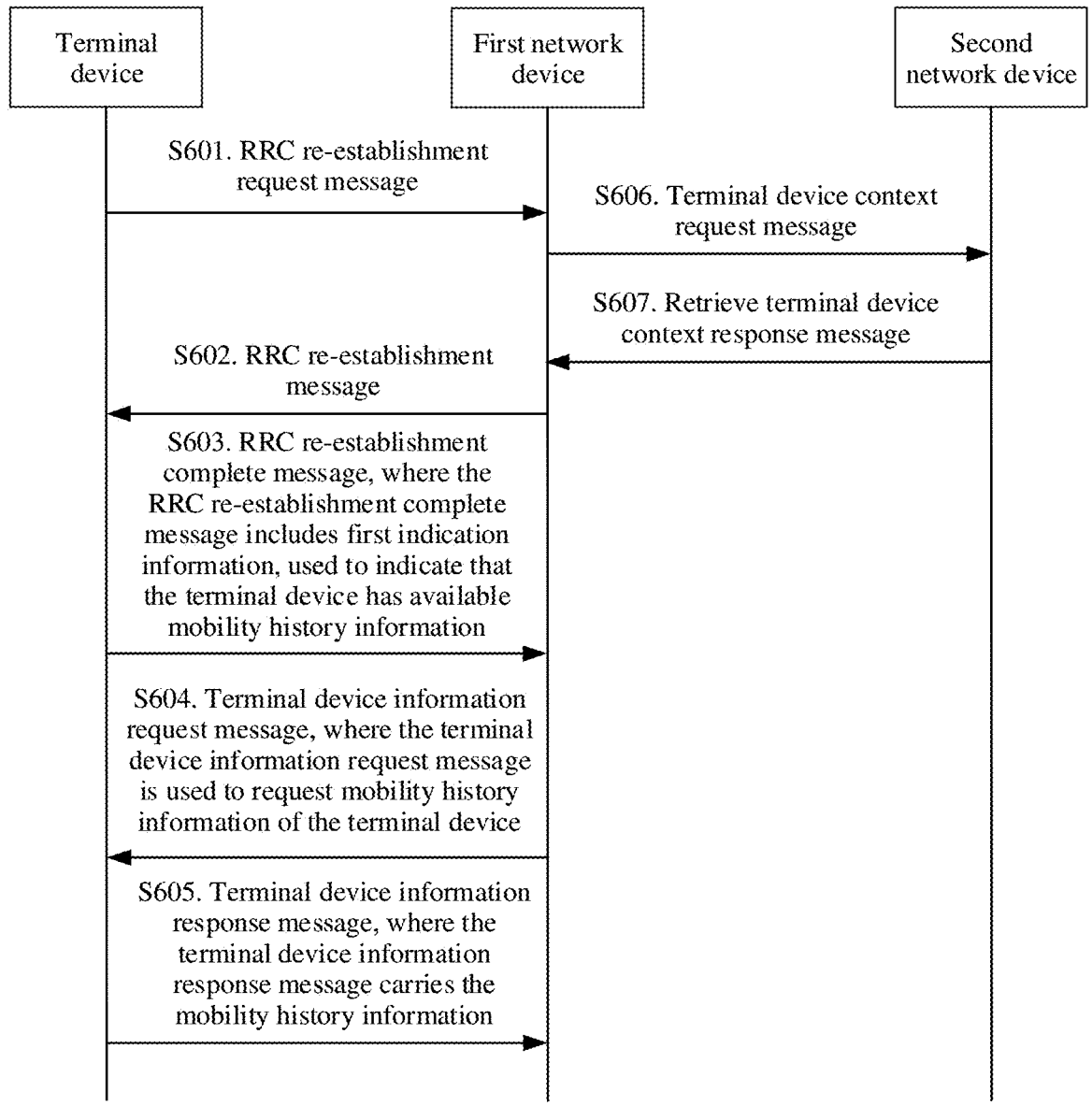
FIG. 6 is a flowchart of an example of a communication method according to an embodiment of this application.

Another embodiment of this application provides a communication method. FIG. 6 is a flowchart of the method. In the following descriptions, an example in which the method is applied to the communication system shown in FIG. 1 is used. In addition, the method may be performed by two communication apparatuses, and the two communication apparatuses are, for example, a first communication apparatus and a second communication apparatus. The first communication apparatus may be a network device or a communication apparatus (for example, a chip system) that can support the network device in implementing a function required in the method, or certainly may be another communication apparatus. The second communication apparatus may be a terminal device or a communication apparatus (for example, a chip system) that can support the terminal device in implementing a function required in the method, or certainly may be another communication apparatus. In addition, implementations of the first communication apparatus and the second communication apparatus are not limited. For example, the two communication apparatuses may be implemented in a same form. For example, both are implemented in a form of a device. Alternatively, the two communication apparatuses may be implemented in different forms. For example, the first communication apparatus is implemented in a form of a device, and the second communication apparatus is implemented in a form of a chip system.

For ease of description, in the following descriptions, an example in which the method is performed by a first network device, a second network device, and a terminal device is used. The first network device may be a base station to which the terminal device needs to connect for RRC re-establishment. An RRC re-establishment process relates to a serving base station of the terminal device before the terminal device initiates the re-establishment process. Therefore, for differentiation, a second network device mentioned below is the serving base station of the terminal device before the terminal device initiates the re-establishment process.

S601. The terminal device sends an RRC re-establishment request message to the first network device, and the first network device receives the RRC re-establishment request message, where the RRC re-establishment request message is a message for requesting to re-establish an RRC connection to the first network device.

S602. The first network device sends an RRC re-establishment message to the terminal device, and the terminal device receives the RRC re-establishment message, where the RRC re-establishment message may be used to indicate the terminal device to re-establish an RRC connection.

S603. The terminal device sends an RRC re-establishment complete message to the first network device, and the first network device receives the RRC re-establishment complete message, where the RRC re-establishment complete message includes first indication information, and the first indication information may be used to indicate that the terminal device has available mobility history information.

In the RRC re-establishment scenario, the terminal device may notify the first network device that the terminal device has available mobility history information. For example, the RRC re-establishment complete message sent by the terminal device to the first network device may include the first indication information, and the first indication information may indicate that the terminal device has available mobility history information. It may be understood that the first indication information may alternatively be carried in another message. This is not limited in this embodiment of this application.

In this way, even if the first network device has no context of the terminal device, when needing mobility history information of the terminal device, the first network device may learn, based on the first indication information, that the terminal device has available mobility history information, to obtain the mobility history information of the terminal device from the terminal device, where the mobility history information is more complete mobility history information. In some possible implementations, the first network device can accurately evaluate a historical movement speed of the terminal device and the like based on the obtained mobility history information. In this way, an appropriate measurement parameter can be set, and a more appropriate target cell can be selected for the terminal device, to improve a cell handover success rate of the terminal device.

Optionally, this embodiment of this application may further include the following steps.

S604. The first network device sends a first message to the terminal device, and the terminal device receives the first message, where the first message is used to request the mobility history information of the terminal device.

The first network device can learn, based on the first indication information, that the terminal device has available mobility history information. After receiving the first indication information, the first network device may send the first message to the terminal device, for example, a terminal device information request (UE information request) message, to obtain the mobility history information of the terminal device from the terminal device.

S605. The terminal device sends a second message to the first network device, and the first network device receives the second message, where the second message includes the mobility history information of the terminal device.

The second message may be a terminal device information response (UE information response) message, and the second message may carry the mobility history information.

Because the first network device obtains latest mobility history information from the terminal device, the latest mobility history information is complete mobility history information. Therefore, a historical movement speed of the terminal device and the like can be accurately evaluated based on the mobility history information. In this way, a measurement parameter that is set based on the mobility history information is also appropriate, and a more appropriate target cell can be selected for the terminal device, to improve a cell handover success rate of the terminal device.

In this embodiment of this application, in the RRC re-establishment scenario, the RRC re-establishment complete message sent by the terminal device to the first network device may carry indication information, to indicate, to the first network device, that the terminal device has available mobility history information, so that the first network device can indicate the terminal device to report the mobility history information. Alternatively, the second network device may send, to the first network device, mobility history information recorded by the terminal device and mobility history information of the terminal device that is recorded by a network device, so that the first network device can obtain complete mobility history information of the terminal device from the second network device. In this solution, the first network device may obtain the complete mobility history information of the terminal device, to set a more appropriate target cell for the terminal device, thereby improving a success rate of cell handover performed by the terminal device, and reducing a quantity of cell handover times.

It should be understood that S506 in FIG. 5 may be similar to S603. To be specific, the RRC re-establishment complete message in S506 includes first indication information, and the first indication information may be used to indicate that the terminal device has available mobility history information. In other words, the RRC re-establishment complete message sent by the terminal device to the first network device includes the first indication information by default. In the embodiment in FIG. 5, after S506, the first network device may perform S604, and subsequently the terminal device may perform S605. In this solution, a second network device may provide the first mobility history information and the second mobility history information, the terminal device may provide the available mobility history information, and the first network device may determine to obtain required mobility history information from the second network device or the terminal device. This is flexible, and more meets an actual requirement.

In the foregoing embodiments provided in this application, the methods provided in embodiments of this application are described from a perspective of interaction between the first network device, the second network device, and the terminal device. To implement functions in the foregoing methods provided in embodiments of this application, each of the first network device, the second network device, and the terminal device may include a hardware structure and/or a software module, and implement the foregoing functions in a form of the hardware structure, the software module, or a combination of the hardware structure and the software module. Whether a specific function in the foregoing functions is performed by using a hardware structure, a software module, or a combination of the hardware structure and the software module depends on a specific application and a design constraint of the technical solutions.

The following describes, with reference to the accompanying drawings, apparatuses configured to implement the foregoing methods in embodiments of this application. Therefore, all the foregoing content may be used in the following embodiments. Repeated content is not described again.

Figure 7:
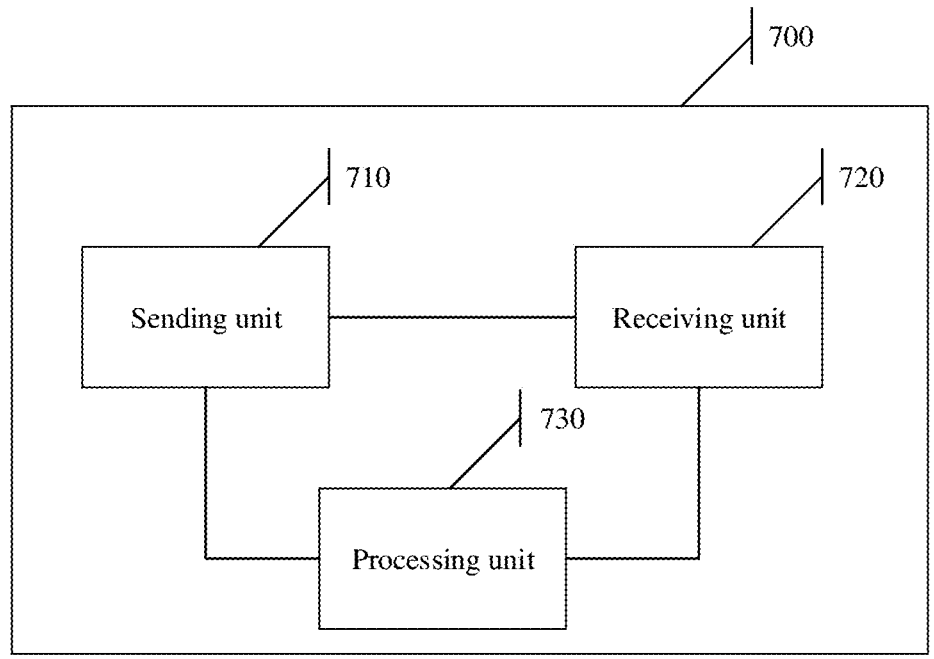
FIG. 7 is a schematic block diagram of a communication apparatus according to an embodiment of this application.

FIG. 7 is a schematic block diagram of a communication apparatus 700 according to an embodiment of this application. The communication apparatus 700 may correspondingly implement functions or steps implemented by the first network device, the second network device, or the terminal device in the foregoing method embodiments. The communication apparatus may include a sending unit 710 and a receiving unit 720, and optionally, may further include a processing unit 730. Optionally, the apparatus may further include a storage unit. The storage unit may be configured to store instructions (code or a program) and/or data. The sending unit 710, the receiving unit 720, and the processing unit 730 may be coupled to the storage unit. For example, the processing unit 730 may read the instructions (the code or the program) and/or the data in the storage unit, to implement a corresponding method. The foregoing units may be disposed independently, or may be partially or completely integrated.

In some possible implementations, the communication apparatus 700 can correspondingly implement behavior and functions of the first network device in the foregoing method embodiments. For example, the communication apparatus 700 may be the first network device, or may be a component (for example, a chip or a circuit) used in the first network device. The sending unit 710 and the receiving unit 720 may be configured to perform all receiving or sending operations performed by the first network device in the embodiment shown in FIG. 2, for example, S201 and S202*a*, or S202*b* in the embodiment shown in FIG. 2, and/or configured to support another process of the technology described in this specification. The processing unit 730 is configured to perform all operations, except receiving and sending operations, performed by the first network device in the embodiment shown in FIG. 2, for example, S301, and/or configured to support another process of the technology described in this specification.

In some embodiments, the sending unit 710 is configured to send a first message to a second network device, where the first message is used to request ta context of a terminal device from the second network device.

The receiving unit 720 is configured to receive a second message from the second network device, where the second message includes first mobility history information and second mobility history information, the first mobility history information is recorded by the terminal device, the second mobility history information is recorded by a network device, and the second message is a response message of the first message.

In an optional implementation, the receiving unit 720 is further configured to receive an RRC re-establishment request message from the terminal device before sending the first message to the second network device. The processing unit 730 is configured to determine that the terminal device is in an RRC connection re-establishment scenario, and store the first mobility history information and the second mobility history information.

In an optional implementation, the receiving unit 720 is further configured to receive an RRC resume request message from the terminal device before sending the first message to the second network device. The RRC resume request message is a message for requesting to resume an RRC connection to the communication apparatus 700.

The processing unit 730 is configured to determine that the terminal device is in an RRC resume scenario, and discard the first mobility history information and the second mobility history information.

It should be understood that, in this embodiment of this application, the processing unit 730 may be implemented by a processor or a processor-related circuit component, and the sending unit 710 and the receiving unit 720 may be implemented by a transceiver, a transceiver-related circuit component, or a communication interface.

In some possible implementations, the communication apparatus 700 can correspondingly implement behavior and functions of the second network device in the foregoing method embodiments. For example, the communication apparatus 700 may be the second network device, or may be a component (for example, a chip or a circuit) used in the second network device. The sending unit 710 and the receiving unit 720 may be configured to perform all receiving or sending operations performed by the second network device in the embodiment shown in FIG. 2, for example, S201 and S202*a*, or S202*b* in the embodiment shown in FIG. 2, and/or configured to support another process of the technology described in this specification. The processing unit 730 is configured to perform all operations, except receiving and sending operations, performed by the second network device in the embodiment shown in FIG. 2, and/or configured to support another process of the technology described in this specification.

In some embodiments, the receiving unit 720 is configured to receive a first message from a first network device, where the first message is used by the first network device to request a context of a terminal device from the communication apparatus 700. The sending unit 710 is configured to send a second message to the first network device, where the second message includes first mobility history information and second mobility history information, the first mobility history information is recorded by the terminal device, the second mobility history information is recorded by a network device, and the second message is a response message of the first message.

In an optional implementation, the first message carries a context identifier of the terminal device.

The sending unit 710 is configured to send the second message to the first network device when the processing unit 730 determines that a type of the context identifier is RRC re-establishment and determines that the second message includes the first mobility history information and the second mobility history information.

Alternatively, the sending unit 710 is configured to send the second message to the first network device when the processing unit 730 determines that the terminal device is in an RRC connected state and determines that the second message includes the first mobility history information and the second mobility history information.

It should be understood that in this embodiment of this application, the processing unit 730 may be implemented by a processor or a processor-related circuit component, and the sending unit 710 and the receiving unit 720 may be implemented by a transceiver or a transceiver-related circuit component.

In some possible implementations, the communication apparatus 700 can correspondingly implement behavior and functions of the second network device in the foregoing method embodiments. For example, the communication apparatus 700 may be the second network device, or may be a component (for example, a chip or a circuit) used in the second network device. The sending unit 710 and the receiving unit 720 may be configured to perform all receiving or sending operations performed by the second network device in the embodiment shown in FIG. 2, for example, S201 and S202*a* in the embodiment shown in FIG. 2, and/or configured to support another process of the technology described in this specification. The processing unit 730 is configured to perform all operations, except receiving and sending operations, performed by the second network device in the embodiment shown in FIG. 2, and/or configured to support another process of the technology described in this specification.

In some embodiments, the receiving unit 720 is configured to receive a first message from a first network device, where the first message is used to request a context of a terminal device from the communication apparatus. The sending unit 710 is configured to send a second message to the first network device, where the second message is a response message of the first message.

If the first message carries a context identifier of the terminal device, and a type of the context identifier is RRC resume, the second message does not include first mobility history information or second mobility history information, or if the terminal device is in an RRC inactive state, the second message does not include first mobility history information or second mobility history information, where the first mobility history information is recorded by the terminal device, and the second mobility history information is recorded by a network device.

In some possible implementations, the communication apparatus 700 can correspondingly implement behavior and functions of the first network device in the foregoing method embodiments. For example, the communication apparatus 700 may be the first network device, or may be a component (for example, a chip or a circuit) used in the first network device. The sending unit 710 and the receiving unit 720 may be configured to perform all receiving or sending operations performed by the first network device in the embodiment shown in FIG. 5, for example, S201 and S202*a*, or S202*b* in the embodiment shown in FIG. 5, and/or configured to support another process of the technology described in this specification. The processing unit 730 is configured to perform all operations, except receiving and sending operations, performed by the first network device in the embodiment shown in FIG. 2, and/or configured to support another process of the technology described in this specification.

In some embodiments, the receiving unit 720 is configured to receive an RRC re-establishment request message from a terminal device. The sending unit 710 is configured to send an RRC re-establishment message to the terminal device. The receiving unit 720 is further configured to receive an RRC re-establishment complete message from the terminal device, where the RRC re-establishment complete message includes first indication information, and the first indication information is used to indicate that the terminal device has available mobility history information.

In an optional implementation, the sending unit 710 is further configured to send a first message to the terminal device, where the first message is used to request mobility history information. The receiving unit 720 is further configured to receive a second message from the terminal device, where the second message includes the mobility history information.

In some possible implementations, the communication apparatus 700 can correspondingly implement behavior and functions of the terminal device in the foregoing method embodiments. For example, the communication apparatus 700 may be a terminal device, or may be a component (for example, a chip or a circuit) used in the terminal device. The sending unit 710 and the receiving unit 720 may be configured to perform all receiving or sending operations performed by the terminal device in the embodiment shown in FIG. 6, for example, S601, S602, S603, S604, and S605 in the embodiment shown in FIG. 6, and/or configured to support another process of the technology described in this specification. The processing unit 730 is configured to perform all operations, except receiving and sending operations, performed by the terminal device in the embodiment shown in FIG. 2, and/or configured to support another process of the technology described in this specification.

In some embodiments, the sending unit 710 is configured to send an RRC re-establishment request message to a first network device. The receiving unit 720 is configured to receive an RRC re-establishment message from the first network device. The sending unit 710 is further configured to send an RRC re-establishment complete message to the first network device, where the RRC re-establishment complete message includes first indication information, and the first indication information is used to indicate that the terminal device has available mobility history information.

In an optional implementation, the receiving unit 720 is further configured to receive a first message from the first network device, where the first message is used to request mobility history information. The sending unit 710 is further configured to send a second message to the first network device, where the second message includes the mobility history information.

It should be understood that the communication apparatus 700 may be the foregoing first network device, and the sending unit 710 and the receiving unit 720 may be configured to perform all receiving or sending operations performed by the first network device in the embodiment shown in FIG. 4 or FIG. 5, for example, S401, S402, S403, and S406 in the embodiment shown in FIG. 4, and/or configured to support another process of the technology described in this specification, and for example, S501, S502, S504, S505, and S406 in the embodiment shown in FIG. 5, and/or configured to support another process of the technology described in this specification. The processing unit 730 is configured to perform all operations, except receiving and sending operations, performed by the first network device in the embodiment shown in FIG. 4 or FIG. 5, and/or configured to support another process of the technology described in this specification, for example, S404 and S405 in the embodiment shown in FIG. 5, and/or configured to support another process of the technology described in this specification.

It should be understood that the communication apparatus 700 may be the foregoing second network device, and the sending unit 710 and the receiving unit 720 may be configured to perform all receiving or sending operations performed by the second network device in the embodiment shown in FIG. 4 or FIG. 5, for example, S402 and S403 in the embodiment shown in FIG. 4, and/or configured to support another process of the technology described in this specification, and for example, S502 and S504 in the embodiment shown in FIG. 5, and/or configured to support another process of the technology described in this specification. The processing unit 730 is configured to perform all operations, except receiving and sending operations, performed by the second network device in the embodiment shown in FIG. 4 or FIG. 5, and/or configured to support another process of the technology described in this specification, for example, S503 in the embodiment shown in FIG. 5, and/or configured to support another process of the technology described in this specification.

Figure 8:
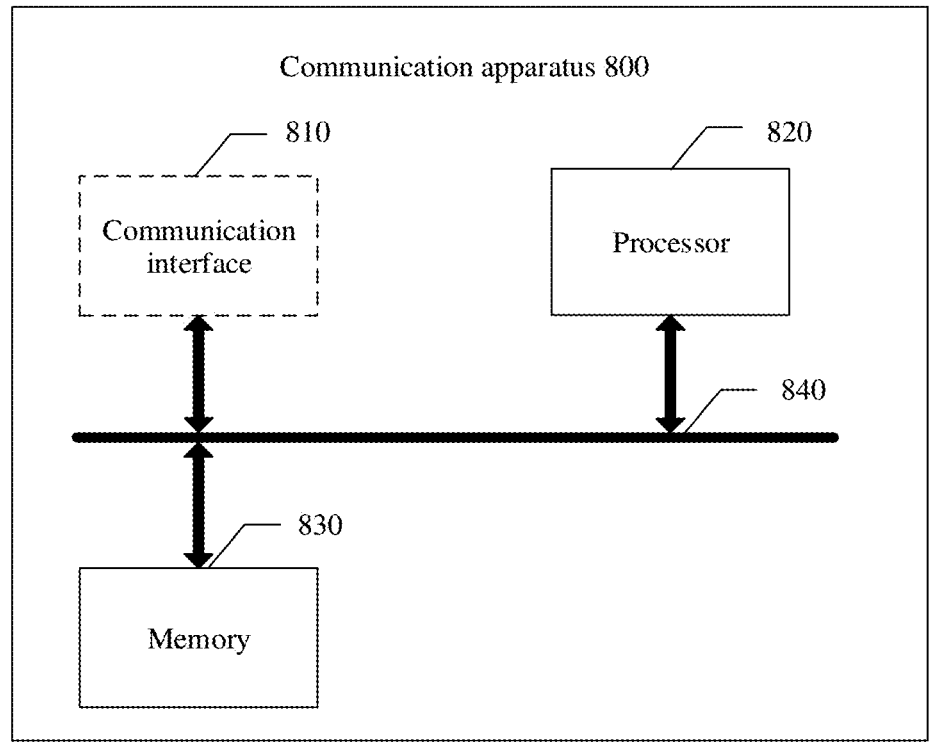
FIG. 8 is a schematic diagram of a structure of a communication apparatus according to an embodiment of this application.

FIG. 8 shows a communication apparatus 800 according to an embodiment of this application. The communication apparatus 800 may be a terminal device, and can implement a function of the terminal device in the methods provided in embodiments of this application. Alternatively, the communication apparatus 800 may be a network device, and can implement a function of the first network device or the second network device in the methods provided in embodiments of this application. Alternatively, the communication apparatus 800 may be an apparatus that can support a terminal device in implementing a corresponding function in the methods provided in embodiments of this application, or may be an apparatus that can support the first network device or the second network device in implementing a corresponding function in the methods provided in embodiments of this application. The communication apparatus 800 may be a chip system. In this embodiment of this application, the chip system may include a chip, or may include a chip and another discrete component.

In hardware implementation, the sending unit 710 and the receiving unit 720 may be a transceiver, and the transceiver is integrated into the communication apparatus 800 to form a communication interface 810.

The communication apparatus 800 includes at least one processor 820, configured to implement or support the communication apparatus 800 in implementing a function of the first network device or the second network device in the methods provided in embodiments of this application. For details, refer to detailed descriptions in the method examples. Details are not described herein again.

The communications apparatus 800 may further include at least one memory 830, configured to store program instructions and/or data. The memory 830 is coupled to the processor 820. Coupling in embodiments of this application is indirect coupling or a communication connection between apparatuses, units, or modules, and may be in an electrical, mechanical, or another form, and is used for information exchange between the apparatuses, units, or modules. The processor 820 may cooperate with the memory 830. The processor 820 may execute the program instructions and/or the data stored in the memory 830, so that the communication apparatus 800 implements a corresponding method. At least one of the at least one memory may be included in the processor.

The communications apparatus 800 may further include a communications interface 810, configured to communicate with another device through a transmission medium, so that an apparatus used in the communications apparatus 800 can communicate with the another device. For example, when the communication apparatus is a terminal device, the another device is a first network device or a second network device, or when the communication apparatus is a first network device or a second network device, the another device is a terminal device. The processor 820 may send and receive data by using the communication interface 810. The communication interface 810 may be specifically a transceiver.

A specific connection medium between the communication interface 810, the processor 820, and the memory 830 is not limited in this embodiment of this application. In this embodiment of this application, the memory 830, the processor 820, and the communications interface 810 are connected by using a bus 840 in FIG. 8, where the bus is represented by a bold line in FIG. 8. The bus may be classified into an address bus, a data bus, a control bus, and the like. For ease of representation, only one bold line is used to represent the bus in FIG. 8, but this does not mean that there is only one bus or only one type of bus.

In this embodiment of this application, the processor 820 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In this embodiment of this application, the memory 830 may be a non-volatile memory such as a hard disk drive (HDD) or a solid-state drive (SSD), or may be a volatile memory such as a random-access memory (RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

It should be noted that the communication apparatus in the foregoing embodiment may be a terminal device, a circuit, or a chip applied to the terminal device, or may be another combined component or component that has a function of the terminal device. When the communication apparatus is the terminal device, the transceiver unit may be a transceiver, and may include an antenna, a radio frequency circuit, and the like. The processing module may be a processor, for example, a central processing unit (CPU). When the communication apparatus is the component having the function of the terminal device, the transceiver unit may be a radio frequency unit, and the processing module may be the processor. When the communication apparatus is the chip system, the transceiver unit may be an input/output interface of the chip system, and the processing module may be a processor of the chip system.

Figure 9:
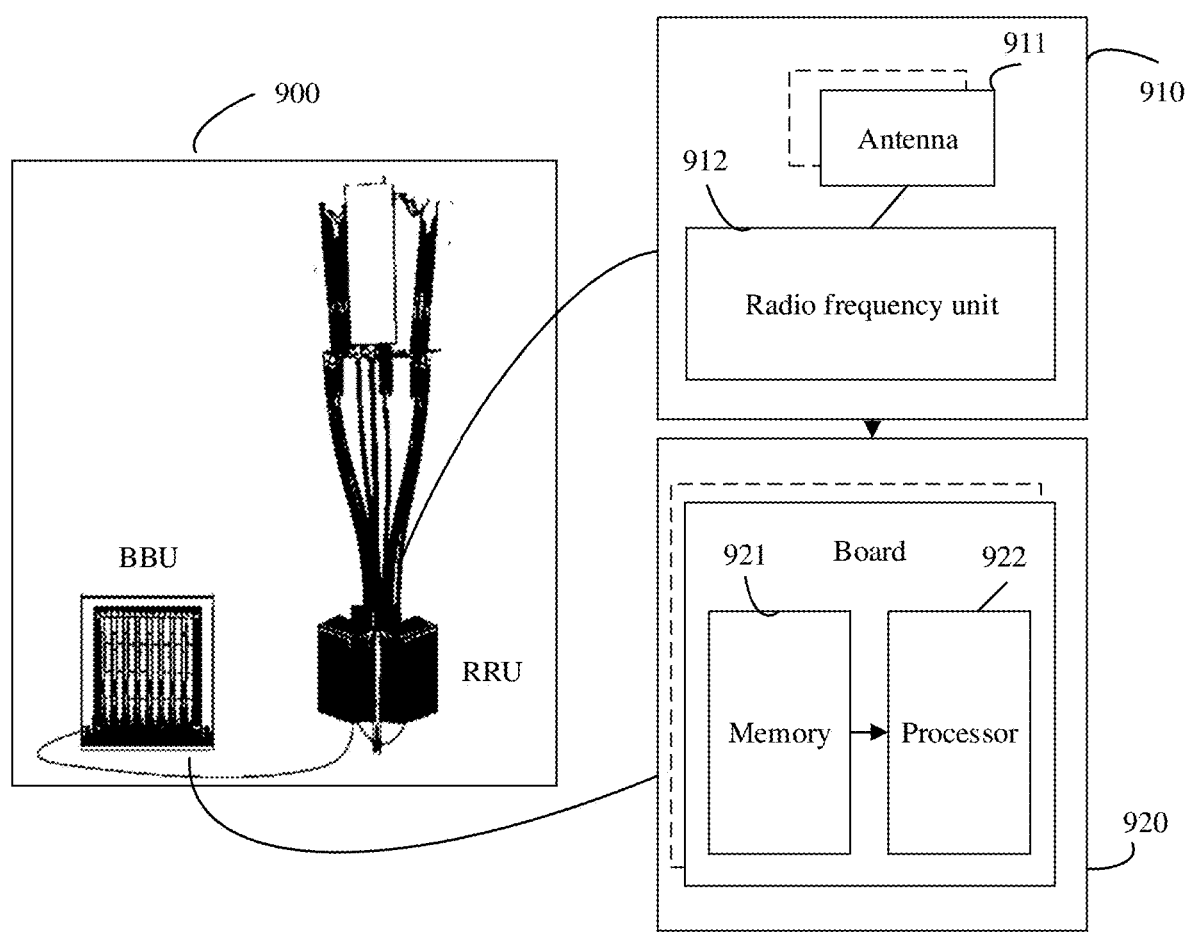
FIG. 9 is another schematic diagram of a structure of a communication apparatus according to an embodiment of this application.

FIG. 9 is a simplified schematic diagram of a structure of a communication apparatus. For ease of understanding and illustration, in FIG. 9, a network device is used as an example of the communication apparatus. The base station may be applied to the system shown in FIG. 1, may be the network device in FIG. 1, and performs functions of the network device in the foregoing method embodiments. The network device 900 may include one or more radio frequency units, for example, a remote radio unit (RRU) 910 and one or more baseband units (BBU) (which may also be referred to as a digital unit (DU)) 920. The RRU 910 may be referred to as a communication module, and corresponds to the sending unit 710 and the receiving unit 720 in FIG. 7. Optionally, the communication module may also be referred to as a transceiver machine, a transceiver circuit, a transceiver, or the like, and may include at least one antenna 911 and a radio frequency unit 912. The RRU 910 is mainly configured to receive and send radio frequency signals, and perform conversion between a radio frequency signal and a baseband signal. For example, the RRU 910 is configured to send indication information to a terminal device. The BBU 920 is mainly configured to perform baseband processing, control a base station, and so on. The RRU 910 and the BBU 920 may be physically disposed together, or may be physically disposed separately, namely, a distributed base station.

The BBU 920 is a control center of the base station, and may also be referred to as a processing module. The BBU 920 may correspond to the processing unit 730 in FIG. 7, and is mainly configured to implement a baseband processing function, for example, channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 920 may include one or more boards, and a plurality of boards may jointly support a radio access network (for example, an LTE network) in a single access standard, or may separately support radio access networks (for example, an LTE network, a 5G network, and another network) in different access standards. The BBU 920 further includes a memory 921 and a processor 922. The memory 921 is configured to store necessary instructions and data. The processor 922 is configured to control the base station to perform necessary actions, for example, configured to control the base station to perform an operation procedure related to the network device in the foregoing method embodiments. The memory 921 and the processor 922 may serve one or more boards. In other words, the memory and the processor may be separately disposed on each board. Alternatively, the plurality of boards may share a same memory and processor. In addition, a necessary circuit may be further disposed on each board.

An embodiment of this application further provides a communication apparatus. The communication apparatus may be a terminal device or a circuit. The communications apparatus may be configured to perform an action performed by the terminal device in the foregoing method embodiment.

Figure 10:
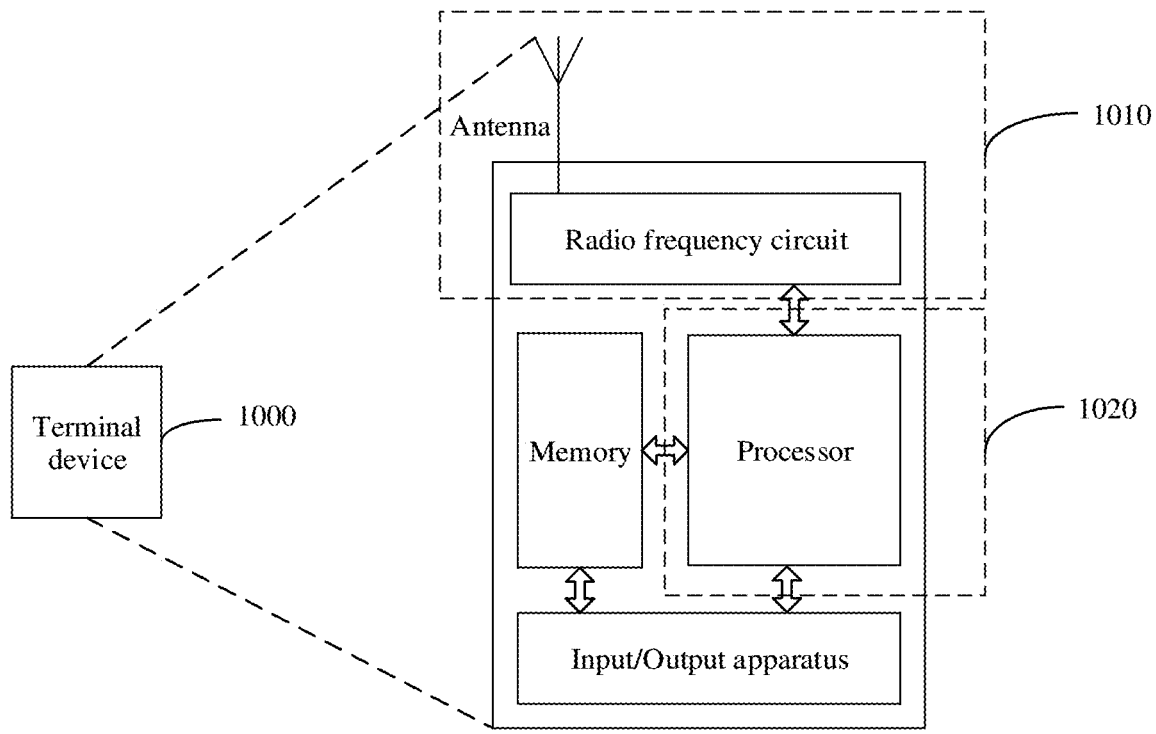
FIG. 10 is a schematic diagram of a structure of a communication apparatus according to an embodiment of this application.

FIG. 10 is a simplified schematic diagram of a structure of a terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to process a communication protocol and communication data, control the terminal device, execute a software program, process data of the software program, and so on. The memory is configured to store software program and data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data entered by a user and output data to the user. It should be noted that some types of devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the device, the radio frequency circuit receives a radio frequency signal through the antenna, converts the radio frequency signal into a baseband signal, and outputs the baseband signal to the processor, and the processor converts the baseband signal into data, and processes the data. For ease of description, FIG. 10 shows only one memory and one processor. In an actual device product, there may be one or more processors and one or more memories. The memory may also be referred to as a storage medium, a storage device, or the like. The memory may be independent of the processor, or may be integrated with the processor. This is not limited in this embodiment of this application.

In this embodiment of this application, the antenna and the radio frequency circuit that have a transceiver function may be considered as a transceiver unit of the apparatus, and the processor having a processing function may be considered as a processing unit of the apparatus. As shown in FIG. 10, the apparatus includes a transceiver unit 1010 and a processing unit 1020. The transceiver unit 1010 may also be referred to as a transceiver, a transceiver machine, a transceiver apparatus, or the like. The processing unit 1020 may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. In other words, the transceiver unit 1010 includes the receiving unit and the sending unit. The transceiver unit 1010 sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 1010 is configured to perform a sending operation and a receiving operation on a terminal device side in the foregoing method embodiments, and the processing unit 1020 is configured to perform another operation other than the receiving operation and the sending operation of the terminal device in the foregoing method embodiments.

For example, in an implementation, the transceiver unit 1010 may be configured to perform S401 in the embodiment shown in FIG. 4, and/or configured to support another process of the technology described in this specification.

For another example, in an implementation, the transceiver unit 1010 may be configured to perform S501, S505, and S506 in the embodiment shown in FIG. 5, and/or configured to support another process of the technology described in this specification.

For another example, in an implementation, the transceiver unit 1010 may be configured to perform S601, S602, S603, S604, and S605 in the embodiment shown in FIG. 6, and/or configured to support another process of the technology described in this specification.

When the communications apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 11:
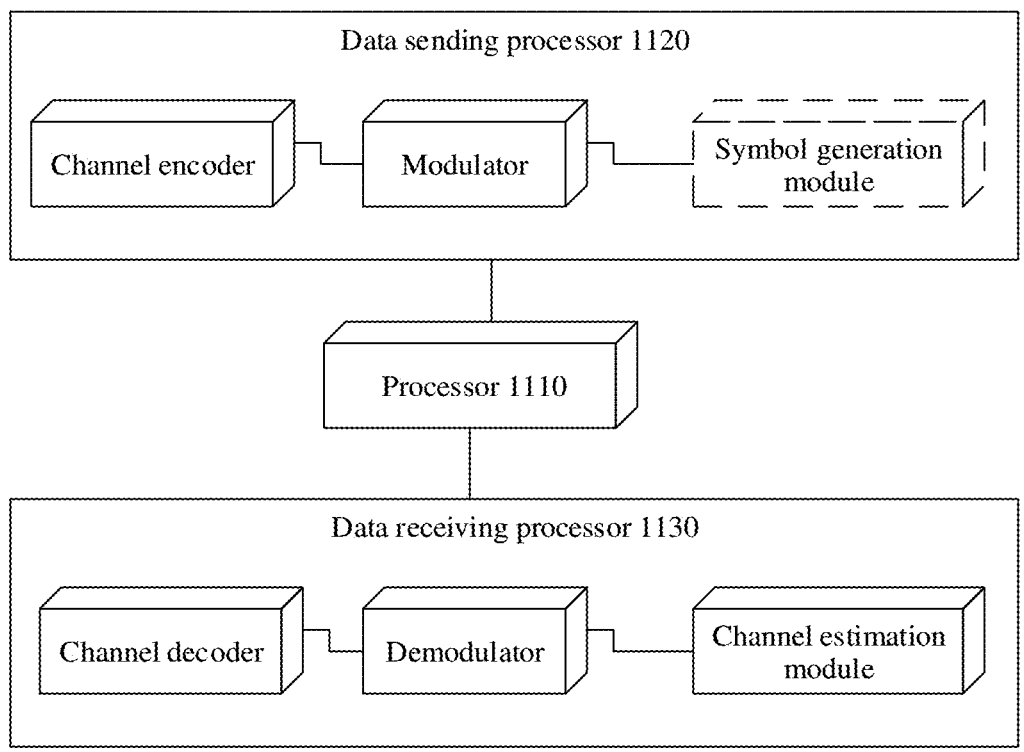
FIG. 11 is another schematic diagram of a structure of a communication apparatus according to an embodiment of this application.

In this embodiment, refer to an apparatus shown in FIG. 11. In an example, the apparatus may implement a function similar to that of the processing unit 730 in FIG. 7. In FIG. 11, the apparatus includes a processor 1110, a data sending processor 1120, and a data receiving processor 1130. The processing unit 730 in the foregoing embodiment may be the processor 1110 in FIG. 11, and implements a corresponding function. The processing unit 730 in the foregoing embodiment may be the data sending processor 1120 and/or the data receiving processor 1130 in FIG. 11. Although FIG. 11 shows a channel encoder and a channel decoder, it may be understood that the modules are merely examples, and do not constitute a limitation on this embodiment.

Figure 12:
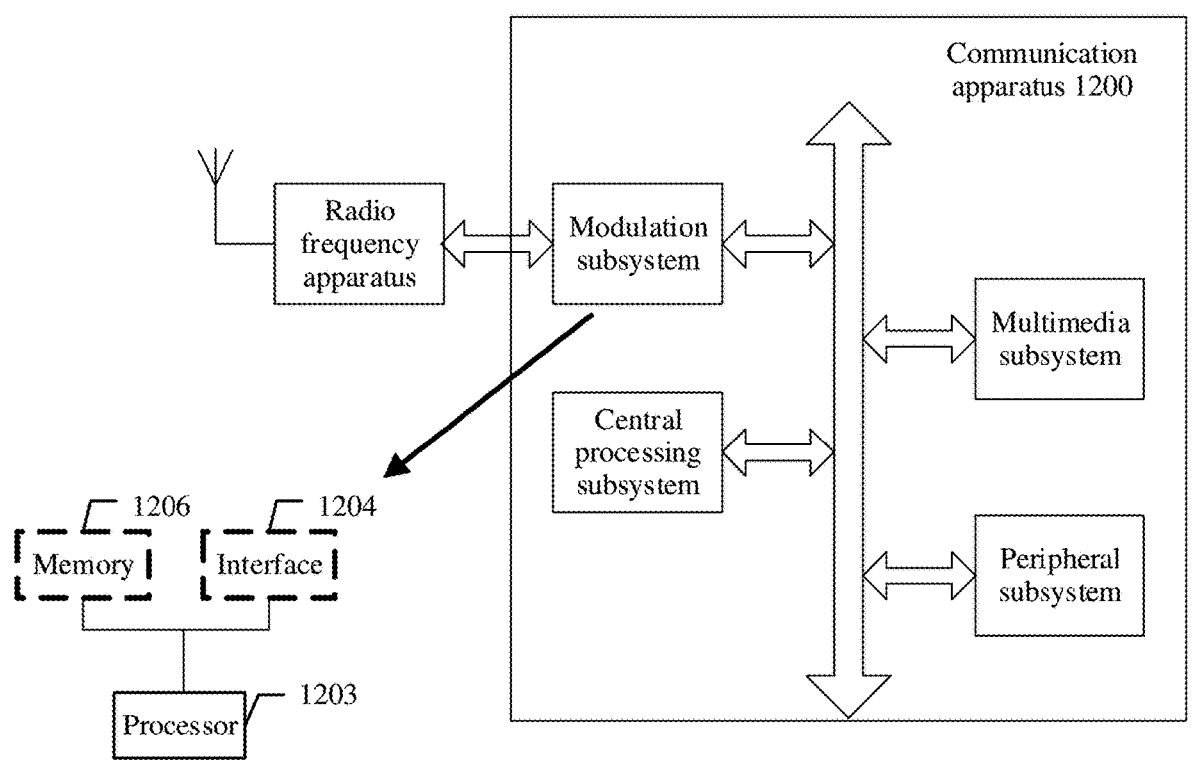
FIG. 12 is another schematic diagram of a structure of a communication apparatus according to an embodiment of this application.

FIG. 12 shows another form of this embodiment. A communication apparatus 1200 includes modules such as a modulation subsystem, a central processing subsystem, and a peripheral subsystem. The communications apparatus in this embodiment may be used as the modulation subsystem. Specifically, the modulation subsystem may include a processor 1203 and an interface 1204. The processor 1203 completes a function of the processing unit 730, and the interface 1204 completes a function of the sending unit 710 and a function of the receiving unit 720. In another variant, the modulation subsystem includes a memory 1206, a processor 1203, and a program that is stored in the memory 1206 and that can be run on the processor. When executing the program, the processor 1203 implements the method performed by the terminal device in the foregoing method embodiments. It should be noted that the memory 1206 may be non-volatile or volatile. The memory 1206 may be located in the modulation subsystem, or may be located in the processing apparatus 1200, provided that the memory 1206 can be connected to the processor 1203.

An embodiment of this application further provides a communication system. Specifically, the communication system includes a first network device, a second network device, and a terminal device, or may include a plurality of first network devices, a plurality of second network devices, and a plurality of terminal devices. For example, the communication system includes a first network device and a second network device that are configured to implement related functions in FIG. 2, the communication system includes a first network device, a second network device, and a terminal device that are configured to implement related functions in FIG. 4, the communication system includes a first network device, a second network device, and a terminal device that are configured to implement related functions in FIG. 5 or FIG. 6, or the communication system includes a first network device, a second network device, and a terminal device that are configured to implement related functions in embodiments in at least two of FIG. 2, FIG. 4, FIG. 5, or FIG. 6.

The first network device and the second network device are configured to implement network-related functions in FIG. 2, FIG. 4, FIG. 5, and FIG. 6. The terminal device is configured to implement terminal-related functions in FIG. 4, FIG. 5, and FIG. 6. For details, refer to the related descriptions in the method embodiments. Details are not described herein again.

An embodiment of this application further provides a computer-readable storage medium, including instructions. When the instructions are run on a computer, the computer performs the method performed by the first network device or the second network device in FIG. 2, FIG. 4, FIG. 5, or FIG. 6, or when the instructions are run on a computer, the computer performs the method performed by the terminal device in FIG. 4, FIG. 5, or FIG. 6.

An embodiment of this application further provides a computer program product, including instructions. When the instructions are run on a computer, the computer performs the method performed by the first network device or the second network device in FIG. 2, FIG. 4, FIG. 5, or FIG. 6, or when the instructions are run on a computer, the computer performs the method performed by the terminal device in FIG. 4, FIG. 5, or FIG. 6.

An embodiment of this application provides a chip system. The chip system includes a processor, and may further include a memory, configured to implement functions of the first network device and the second network device in the foregoing methods, or configured to implement functions of the first network device, the second network device, and the terminal device in the foregoing methods. The chip system may include a chip, or may include a chip and another discrete component.

It should be understood that the terms "system" and "network" may be used interchangeably in embodiments of this application. In addition, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. A character "/" generally indicates an "or" relationship between the associated objects. Moreover, "at least one of the following items (pieces)" or a similar expression thereof means any combination of these items, including a singular item (piece) or any combination of plural items (pieces). For example, at least one item (piece) of a, b, or c may represent a, b, c, a-b, a-c, b-c, or a-b-c. Herein, a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, a first message and a second message are merely intended to distinguish between different messages, but do not indicate that the two messages are different in a priority, a sending sequence, importance, or the like.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It may further be understood that the memory mentioned in embodiments of this application may be a volatile memory or a nonvolatile memory, or may include both a volatile memory and a nonvolatile memory. The nonvolatile memory may be the read-only memory (ROM), the programmable read-only memory (programmable ROM, PROM), an erasable programmable read-only memory (erasable PROM, EPROM), the electrically-erasable programmable read-only memory (electrically EPROM, EEPROM), or the flash memory. The volatile memory may be the random access memory (RAM), used as an external cache. Through example but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate, a transistor logic device, or a discrete hardware component, the memory (storage module) is integrated into the processor.

It should be noted that the memory described in this specification aims to include but is not limited to these memories and any memory of another proper type.

It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, unit division is merely logical service division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
    sending, by a first network device, to a second network device, a first message requesting a context of a terminal device from the second network device;
    receiving, in response to a type of scenario in which the terminal device is to establish a connection to the first network device being radio resource control (RRC) re-establishment, by the first network device from the second network device, a second message which comprises first mobility history information and second mobility history information, wherein the first mobility history information is recorded by the terminal device, wherein the second mobility history information is recorded by a network device, and wherein the second message is a response message of the first message; and
    receiving, in response to the type of scenario in which the terminal device is to establish a connection to the first network device being RRC resume, by the first network device from the second network device, a third message that excludes the first mobility history information and the second mobility history information.

2. The method according to claim 1, further comprising performing, before the sending the first message to the second network device:
    receiving, by the first network device, an RRC re-establishment request message from the terminal device.

3. The method according to claim 2, wherein the terminal device is in an RRC connected state when the terminal device sends the RRC re-establishment request message.

4. The method according to claim 2, further comprising performing, after the receiving the second message from the second network device:
    storing, by the first network device, the first mobility history information and the second mobility history information.

5. The method according to claim 1, further comprising performing, before the sending the first message to the second network device:
    receiving, by the first network device, an RRC resume request message from the terminal device.

6. The method according to claim 5, wherein the terminal device is in an RRC inactive state when the terminal device sends the RRC resume request message.

7. A communication method, comprising:
    receiving, by a second network device, a first message from a first network device, wherein the first message requests a context of a terminal device from the second network device; and
    sending, in response to a type of scenario in which the terminal device is to establish a connection to the first network device being radio resource control (RRC) re-establishment, by the second network device to the first network device, a second message which comprises first mobility history information and second mobility history information, wherein the first mobility history information is recorded by the terminal device, wherein the second mobility history information is recorded by a network device, and wherein the second message is a response message of the first message; and
    sending, in response to a type of scenario in which the terminal device is to establish a connection to the first network device being RRC resume, a third message that excludes the first mobility history information and the second mobility history information.

8. The method according to claim 7, wherein the sending, by the second network device, the second message to the first network device comprises:
    performing, in response to the first message carrying a context identifier of the terminal device, and further in response to the second network device determining that a type of the context identifier is RRC re-establishment:
        including, by the second network device, the first mobility history information and the second mobility history information in the second message; and
        sending the second message to the first network device.

9. The method according to claim 7, wherein the sending, by the second network device, the second message to the first network device comprises:
    performing, in response to the second network device determining that the terminal device is in an RRC connected state:
        determining, by the second network device, that the second message comprises the first mobility history information and the second mobility history information; and
        sending the second message to the first network device.

10. A communication system comprising:
    a first network device; and
    a second network device;
    wherein the first network device is configured to send, to the second network device, a first message requesting a context of a terminal device from the second network device;
    wherein the first network device is further configured to receive, in response to a type of scenario in which the terminal device is to establish a connection to the first network device being radio resource control (RRC) re-establishment, from the second network device, a second message which comprises first mobility history information and second mobility history information, wherein the first mobility history information is recorded by the terminal device, wherein the second mobility history information is recorded by a network device, and wherein the second message is a response message of the first message; and
    wherein the first network device is further configured to receive, in response to a type of scenario in which the terminal device is to establish a connection to the first network device being RRC resume, a third message that excludes the first mobility history information and the second mobility history information.

11. The system according to claim 10, wherein the first network device is further configured to receive an RRC re-establishment request message from the terminal device before sending the first message.

12. The system according to claim 11, wherein the terminal device is in an RRC connected state when the terminal device sends the RRC re-establishment request message.

13. The system according to claim 11, wherein the first network device is further configured to store the first mobility history information and the second mobility history information.

14. The system according to claim 10, wherein the first network device is further configured to receive an RRC resume request message from the terminal device.

15. The system according to claim 14, wherein the terminal device is in an RRC inactive state when the terminal device sends the RRC resume request message.

16. The system according to claim 10, wherein the second network device is configured to:
perform, in response to the first message carrying a context identifier of the terminal device, and further in response to the second network device determining that a type of the context identifier is RRC re-establishment:
include the first mobility history information and the second mobility history information in the second message; and
send the second message to the first network device.

17. The system according to claim 10, wherein the second network device is configured to:
perform, in response to the second network device determining that the terminal device is in an RRC connected state:
determine that the second message comprises the first mobility history information and the second mobility history information; and
send the second message to the first network device.

* * * * *